(12) United States Patent
Abramov et al.

(10) Patent No.: US 12,397,937 B2
(45) Date of Patent: Aug. 26, 2025

(54) WING SYSTEM FOR AIR VEHICLE

(71) Applicant: ISRAEL AEROSPACE INDUSTRIES LTD., Lod (IL)

(72) Inventors: Danny Abramov, Shoham (IL); Yonatan Klein, Nes-Ziona (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 18/000,840

(22) PCT Filed: Jun. 8, 2021

(86) PCT No.: PCT/IL2021/050684
§ 371 (c)(1),
(2) Date: Dec. 6, 2022

(87) PCT Pub. No.: WO2021/250660
PCT Pub. Date: Dec. 16, 2021

(65) Prior Publication Data
US 2023/0211869 A1     Jul. 6, 2023

(30) Foreign Application Priority Data
Jun. 9, 2020    (IL) .......................................... 275254

(51) Int. Cl.
*B64U 30/12* (2023.01)
*B64C 3/56* (2006.01)
*B64C 9/18* (2006.01)

(52) U.S. Cl.
CPC ................ *B64U 30/12* (2023.01); *B64C 3/56* (2013.01); *B64C 9/18* (2013.01); *B64U 2201/20* (2023.01)

(58) Field of Classification Search
CPC ........ B64U 20/50; B64U 30/12; B64U 70/50; B64C 3/56; B64C 3/546; B64C 3/40; B64C 3/16; F42B 10/14
See application file for complete search history.

(56) References Cited

U.S. PATENT DOCUMENTS

| | | | | |
|---|---|---|---|---|
| 1,792,015 | A | * | 2/1931 | Herrick ..................... B64C 3/14 244/35 R |
| 2,709,052 | A | * | 5/1955 | Berg ......................... B64C 3/14 416/223 R |

(Continued)

FOREIGN PATENT DOCUMENTS

| | | |
|---|---|---|
| CN | 107380402 A | 11/2017 |
| CN | 107380402 B | 10/2020 |

(Continued)

OTHER PUBLICATIONS

International Search Report and Written Opinion mailed Aug. 31, 2021 in PCT/IL2021/050684.

(Continued)

*Primary Examiner* — Richard Green
(74) *Attorney, Agent, or Firm* — Ballard Spahr LLP

(57) ABSTRACT

A wing system is provided for an air vehicle, the wing system having a stowed configuration, a pre-deployed configuration, and a deployed configuration. The wing system includes two wings, each wing having aerofoil profiles and being pivotably deployable about a respective pivot axis between the pre-deployed configuration and the deployed configuration. In the stowed configuration the two wings are in first general superposed spatial relationship with respect to one another and are capable of being accommodated within an envelope having an envelope cross-sectional profile and a corresponding envelope cross-sectional area. In the pre-deployed configuration, the two wings are in second general superposed spatial relationship with respect to one (Continued)

another and capable of deploying to the deployed configuration. In the deployed configuration the wings are each capable of generating aerodynamic lift in an airstream. Each aerofoil profile of each wing is a slotted aerofoil having a primary element, a secondary element and a chord, the secondary element being pivotable with respect to the primary element and spaced therefrom by a gap. Each aerofoil profile has a respective maximum thickness, and a respective maximum absolute thickness. In the stowed configuration, the respective second element of each aerofoil of one wing is set at a different flap angle as compared with the respective second element of each aerofoil of the other wing.

23 Claims, 12 Drawing Sheets

(56) References Cited

U.S. PATENT DOCUMENTS

| | | | | |
|---|---|---|---|---|
| 4,530,476 | A * | 7/1985 | Thurber, Jr. | B64U 30/12 |
| | | | | 89/1.801 |
| 8,985,504 | B2 * | 3/2015 | Tao | B64C 3/56 |
| | | | | 244/3.28 |
| 9,452,820 | B1 * | 9/2016 | Wirth | B64C 3/16 |
| 9,545,991 | B1 * | 1/2017 | Alley | B64U 30/12 |
| 11,814,165 | B2 * | 11/2023 | Noskowicz | B64U 70/50 |
| 2012/0280080 | A1 * | 11/2012 | Lubenow | B64U 30/12 |
| | | | | 244/49 |
| 2013/0146718 | A1 | 6/2013 | Tao et al. | |
| 2016/0137288 | A1 * | 5/2016 | Shepshelovich | B64C 3/14 |
| | | | | 244/216 |
| 2017/0369150 | A1 | 12/2017 | Finklea et al. | |

FOREIGN PATENT DOCUMENTS

| | | |
|---|---|---|
| EP | 3130535 A1 | 2/2017 |
| EP | 3560820 A1 | 10/2019 |
| JP | 2017036028 A | 2/2017 |
| WO | 2014199371 A1 | 12/2014 |
| WO | 2018044182 A2 | 3/2018 |

OTHER PUBLICATIONS

International Preliminary Report on Patentability mailed Aug. 30, 2022 in PCT/IL2021/050684.

* cited by examiner

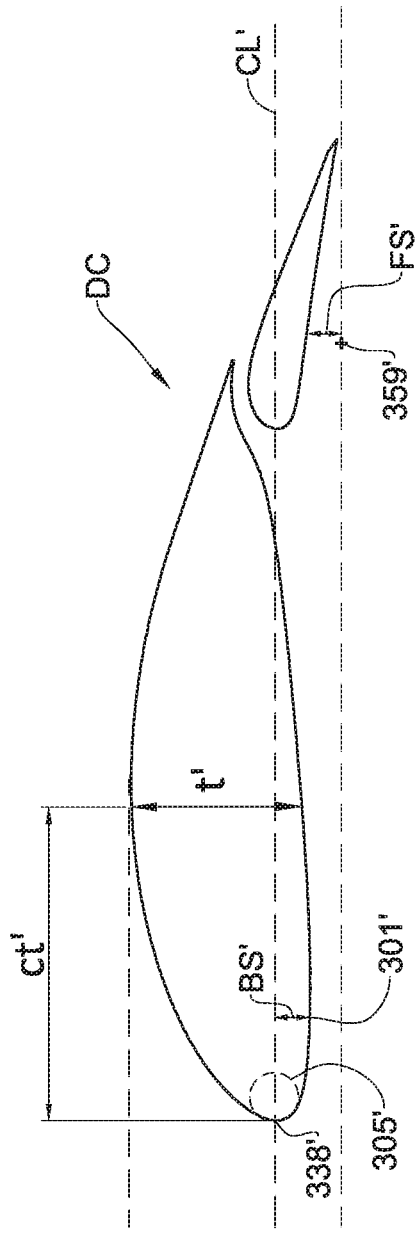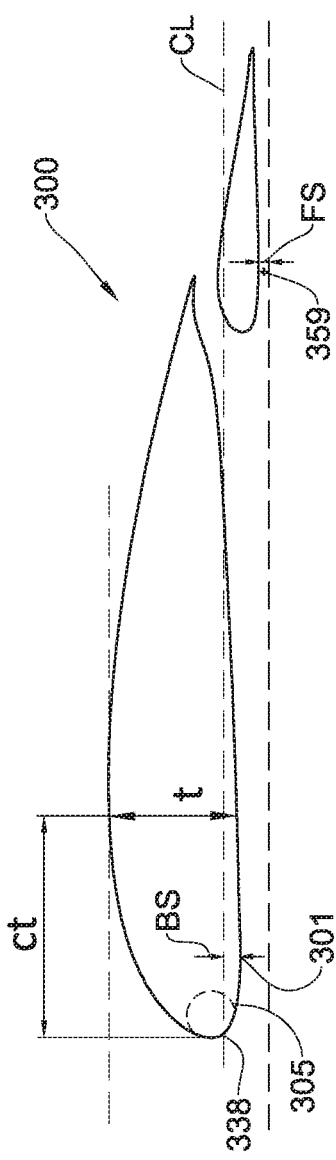
Fig. 5(a)
Fig. 5(b)

ND AIR VEHICLE

TECHNOLOGICAL FIELD

This invention relates to wing systems for an air vehicle, in particular to high-lift aerofoils, and wings therefor.

BACKGROUND

Some types of air vehicles, for example some types of unmanned air vehicles (UAVs), are configured as subsonic air vehicles. In some cases, the air vehicle is launched with the lift-generating wings folded in close proximity to the fuselage, and the wings are subsequently deployed to enable aerodynamic flight.

By way on non-limiting example, US 2017/369150 describes, in one embodiment, a wing for an unmanned aerial vehicle. The unmanned aerial vehicle includes a first body of the wing with a first end proximate a body of the vehicle. A second end is opposite the first end. A first joint is on the first end of the first main body of the wing. The joint rotatably couples the wing to the vehicle. A second joint is on the second end of the vehicle. A second body of the wing is rotatably coupled to the first body via the second joint.

Also by way of non-limiting example, CN107380402 discloses an unmanned aerial vehicle with folding wings. The unmanned aerial vehicle with the folding wings comprises a fuselage, the wings, horizontal tails, vertical tails, a folding wing releasing mechanism and a fixing base, and positioning holes are formed in the wings, the horizontal tails and the vertical tails; and positioning clamp columns are arranged on the fixing base, and the positioning clamp columns are matched with the positioning holes.

GENERAL DESCRIPTION

According to a first aspect of the presently disclosed subject matter there is provided a wing system for an air vehicle, the wing system having a stowed configuration, a pre-deployed configuration and a deployed configuration, the wing system comprising:
  two wings, each said wing having an aerofoil profile and being pivotably deployable about a respective pivot axis between the pre-deployed configuration and the deployed configuration, wherein:
  in the stowed configuration the two wings are in first general superposed spatial relationship with respect to one another and are capable of or configured for being accommodated within an envelope having an envelope cross-sectional profile and a corresponding envelope cross-sectional area;
  in the pre-deployed configuration the two wings are in second general superposed spatial relationship with respect to one another and capable of deploying to the deployed configuration; and
  in the deployed configuration the wings are each capable of generating aerodynamic lift in an airstream;
  each said aerofoil profile being a slotted aerofoil having a primary element, a secondary element and a chord, the secondary element being pivotable with respect to the primary element and spaced therefrom by a gap, each said aerofoil profile having a respective maximum thickness, and a respective maximum absolute thickness;
  wherein in said stowed configuration, the respective second element of each said aerofoil profile of one said wing is set at a different flap angle as compared with the respective second element of each said aerofoil profile of the other said wing.

For example, each said wing having a span and an aerofoil profile at least at one respective transverse cross-section orthogonal to the respective span.

Additionally or alternatively, for example, in said stowed configuration, the respective second element of each said aerofoil profile of one said wing is set at a different flap angle as compared with the respective second element of each said aerofoil profile of the other said wing.

Additionally or alternatively, for example, said two wings comprise a first said wing having a first said aerofoil profile, the first aerofoil profile comprising a first leading edge and a first trailing edge, and a said second wing having a first said aerofoil profile, the second aerofoil profile comprising a second leading edge and a second trailing edge. For example, in said pre-deployed configuration, said first leading edge is generally superposed over said second trailing edge.

Additionally or alternatively, for example, a respective maximum absolute thickness to chord ratio of each said wing is such as to enable the wings to deploy from the pre-deployed configuration to the deployed configuration without interference therebetween.

Additionally or alternatively, for example, the respective second element of each said aerofoil profile of each said wing has a hinge axis for enabling pivoting of the respective second element with respect to the respective primary element. For example, said hinge axis is facing a pressure surface of the respective secondary element. Additionally or alternatively, for example, wherein for each said aerofoil profile, the respective hinge axis is spaced from the pressure surface of the respective secondary element by a spacing. For example, said spacing is less than 50% of a maximum thickness of the secondary element. For example, example, said spacing can be any one of: 40%, 30%, 20%, 10%, 5%, 1%, 0%, of a maximum thickness of the secondary element.

Additionally or alternatively, for example, in said pre-deployed configuration, the respective second element of each said aerofoil profile of each said wing is set at a respective first negative flap angle.

Additionally or alternatively, for example, in said pre-deployed configuration, the respective second element of each said aerofoil profile of each said wing is set at an identical flap angle.

Additionally or alternatively, for example, in said pre-deployed configuration, the respective second element of each said aerofoil profile of each said wing is set at a respective first flap angle such that no part of the respective second flap intersects an imaginary line that is tangential to the respective aerofoil profile leading edge and that intersects the respective hinge axis.

Additionally or alternatively, for example, wherein each said aerofoil profile is configured with a minimum respective said absolute thickness and a maximum said chord such that in said stowed configuration the respective said aerofoil profiles of said two wings in said first general superposed spatial relationship are capable of being accommodated within said envelope cross-sectional profile while concurrently maximizing occupancy of said envelope cross-sectional area.

Additionally or alternatively, for example, the wing system is configured for being mounted to an underside of a fuselage of the air vehicle. For example, in said stowed configuration, the respective second element of each said aerofoil profile of each said wing is set at a respective negative flap angle. Additionally or alternatively, for example, in said stowed configuration, the respective second element of each said aerofoil profile of an uppermost said wing is set at a respective negative flap angle in a range −25° to −35°, and wherein the respective second element of each said aerofoil profile of an lowermost said wing is set at a respective negative flap angle in a range −55° to −65°. Additionally or alternatively, for example, wherein in said stowed configuration, the respective second element of each said aerofoil profile of each said wing is set at a respective second flap angle such that the respective said trailing edge and the respective hinge axis of the respective second element are on opposite sides of the respective chord line of the aerofoil profile.

Additionally or alternatively, for example, the wing system is configured for being mounted to an upper side of a fuselage of the air vehicle. For example, in said stowed configuration, the respective second element of each said aerofoil profile of each said wing is set at a respective positive flap angle. Additionally or alternatively, for example, in said stowed configuration, the respective second element of each said aerofoil profile of an uppermost said wing is set at a respective positive flap angle in a range +15° to +25°, and wherein the respective second element of each said aerofoil profile of an lowermost said wing is set at a respective positive flap angle in a range +1° to +10°.

Additionally or alternatively, for example, each said aerofoil profile has a first maximum spacing of the respective pressure surface from the chord line, and a second maximum spacing of the respective hinge axis from the chord line, wherein said first maximum spacing and said second maximum spacing are similar for example within 10% of one another.

Additionally or alternatively, for example, for each said aerofoil profile, the respective said maximum thickness to chord ratio, and the respective said maximum absolute thickness to chord ratio have magnitudes that are within 10% of one another, for example 1% of the chord.

Additionally or alternatively, for example, for each said aerofoil profile, the respective said maximum thickness to chord ratio is in the range 0.10 to 0.14.

Additionally or alternatively, for example, for each said aerofoil profile, the respective said maximum absolute thickness to chord ratio is in the range 0.10 to 0.15.

Additionally or alternatively, for example, each said aerofoil profile has a respective said maximum thickness at a position less than 25% of the chord from the leading edge of the aerofoil profile.

Additionally or alternatively, for example, each said aerofoil profile has a respective said maximum thickness at a position about 20% of the chord from the leading edge of the aerofoil profile.

Additionally or alternatively, for example, each said aerofoil profile has a camber profile with a maximum camber of about 6% or less of the chord.

Additionally or alternatively, for example, wherein each said aerofoil profile, includes at least one of the following:
  the respective said gap varies between about 2.3% to about 1.2% of the chord, as the respective said flap angle increases from 0° to 30°;
  the respective said gap varies between about 2.3% to about 2.5% of the chord, as the respective said flap angle decreases from 0° to −20°.

Additionally or alternatively, for example, for each said aerofoil profile, the respective leading edge radius is about 2% of the chord.

Additionally or alternatively, for example, for each said aerofoil profile, the respective said primary element has a primary element trailing edge, and wherein the respective said secondary element has a secondary element leading edge includes one of the following:
  wherein the primary element trailing edge overlaps the secondary element leading edge by a longitudinal overlap in a direction parallel to the chord;
  wherein the primary element trailing edge overlaps the secondary element leading edge by a longitudinal overlap in a direction parallel to the chord, and, the respective said longitudinal overlap varies between about 5% to about 3% of the chord, as the respective said flap angle increases from 0° to 30°;
  wherein the primary element trailing edge overlaps the secondary element leading edge by a longitudinal overlap in a direction parallel to the chord, and, wherein for each said aerofoil profile, the respective said longitudinal overlap varies between about 5% to about 5.5% of the chord, as the respective said flap angle decreases from 0° to −20°.

Additionally or alternatively, for example, each said aerofoil profile is configured as a high lift aerofoil profile. For example, said aerofoil profile is configured as having a maximum lift coefficient of at least 2.5 at zero flap angle, or, said aerofoil profile is configured as having a maximum lift coefficient of greater than 2.3 at zero flap angle. Additionally or alternatively, for example, said maximum lift coefficient corresponds to an angle of attack of between about 15° and about 16°.

Additionally or alternatively, for example, said aerofoil profile is configured as having a lift coefficient of 1.0 corresponds to an angle of attack of about 0°.

Additionally or alternatively, for example, said aerofoil profiles of said two wings have an aggregate cross-sectional area corresponding to a said occupancy of between 40% and 30% of said envelope cross-sectional area.

Additionally or alternatively, for example, said envelope cross-sectional profile is in the form of a segment of a circle of predetermined diameter, the segment being defined by a corresponding arc portion and a corresponding chord portion. For example, for each said aerofoil profile, a respective first ratio of said chord to said diameter is in the range 70% to 87%. For example, for each said aerofoil profile, the respective first ratio is in the range 75% to 85%. Additionally or alternatively, for example, for each said aerofoil profile, a respective second ratio of said maximum thickness to said diameter is in the range 7% to 12%. Additionally or alternatively, for example, for each said aerofoil profile, a respective second ratio of said maximum absolute thickness to said diameter is in the range 8% to 14%.

Additionally or alternatively, for example, each said wing is configured with zero taper, and wherein each wing has a uniform said aerofoil profile along the respective span thereof. Alternatively, for example, each said wing is configured with non-zero taper, and wherein each wing has a uniform said aerofoil profile along the respective span thereof.

Additionally or alternatively, for example, the wing system is configured for selectively enabling the wings to transition from the stowed configuration to the pre-deployed configuration under predetermined conditions.

Additionally or alternatively, for example, the wing system is configured for maintain a negative said deflection angle for each aerofoil profile of each wing during deployment from the pre-deployed configuration through to the deployed configuration.

According to the first aspect of the presently disclosed subject matter there is also provided a wing system for an air vehicle, the wing system having at least a stowed configuration, a pre-deployed configuration and a deployed configuration, the wing system comprising:

two wings, each said wing being pivotably deployable about a respective pivot axis between the pre-deployed configuration and the deployed configuration, wherein:
in the stowed configuration the two wings are in first general superposed spatial relationship with respect to one another and are capable of being accommodated within an envelope having an envelope cross-sectional profile and a corresponding envelope cross-sectional area;
in the pre-deployed configuration the two wings are in second general superposed spatial relationship with respect to one another and capable of deploying to the deployed configuration; and
in the deployed configuration the wings are each capable of generating aerodynamic lift in an airstream;
each said wing having a span and an aerofoil profile at least at one respective transverse cross-section orthogonal to the respective span;
each said aerofoil profile being a slotted aerofoil having a primary element, a secondary element and a chord, the secondary element being pivotable with respect to the primary element and spaced therefrom by a gap, each said aerofoil profile having a respective maximum thickness, and a respective maximum absolute thickness;
wherein each said aerofoil profile is configured with a minimum respective said absolute thickness and a maximum said chord such that in said stowed configuration the respective said aerofoil profiles of said two wings in said first general superposed spatial relationship are capable of being accommodated within said envelope cross-sectional profile while concurrently maximizing occupancy of said envelope cross-sectional area.

For example, in said stowed configuration, the respective second element of each said aerofoil profile of one said wing is set at a different flap angle as compared with the respective second element of each said aerofoil profile of the other said wing.

Additionally or alternatively, for example, said two wings comprise a first said wing having a first said aerofoil profile, the first aerofoil profile comprising a first leading edge and a first trailing edge, and a said second wing having a first said aerofoil profile, the second aerofoil profile comprising a second leading edge and a second trailing edge. For example, in said pre-deployed configuration, said first leading edge is generally superposed over said second trailing edge.

Additionally or alternatively, for example, a respective maximum absolute thickness to chord ratio of each said wing is such as to enable the wings to deploy from the pre-deployed configuration to the deployed configuration without interference therebetween.

Additionally or alternatively, for example, the respective second element of each said aerofoil profile of each said wing has a hinge axis for enabling pivoting of the respective second element with respect to the respective primary element. For example, said hinge axis is facing a pressure surface of the respective secondary element. Additionally or alternatively, for example, wherein for each said aerofoil profile, the respective hinge axis is spaced from the pressure surface of the respective secondary element by a spacing.

For example, said spacing is less than 50% of a maximum thickness of the secondary element. For example, example, said spacing can be any one of: 40%, 30%, 20%, 10%, 5%, 1%, 0%, of a maximum thickness of the secondary element.

Additionally or alternatively, for example, in said pre-deployed configuration, the respective second element of each said aerofoil profile of each said wing is set at a respective first negative flap angle.

Additionally or alternatively, for example, in said pre-deployed configuration, the respective second element of each said aerofoil profile of each said wing is set at an identical flap angle.

Additionally or alternatively, for example, in said pre-deployed configuration, the respective second element of each said aerofoil profile of each said wing is set at a respective first flap angle such that no part of the respective second flap intersects an imaginary line that is tangential to the respective aerofoil profile leading edge and that intersects the respective hinge axis.

Additionally or alternatively, for example, the wing system is configured for being mounted to an underside of a fuselage of the air vehicle. For example, in said stowed configuration, the respective second element of each said aerofoil profile of each said wing is set at a respective negative flap angle. Additionally or alternatively, for example, in said stowed configuration, the respective second element of each said aerofoil profile of an uppermost said wing is set at a respective negative flap angle in a range −25° to −35°, and wherein the respective second element of each said aerofoil profile of an lowermost said wing is set at a respective negative flap angle in a range −55° to −65°. Additionally or alternatively, for example, wherein in said stowed configuration, the respective second element of each said aerofoil profile of each said wing is set at a respective second flap angle such that the respective said trailing edge and the respective hinge axis of the respective second element are on opposite sides of the respective chord line of the aerofoil profile.

Additionally or alternatively, for example, the wing system is configured for being mounted to an upper side of a fuselage of the air vehicle. For example, in said stowed configuration, the respective second element of each said aerofoil profile of each said wing is set at a respective positive flap angle. Additionally or alternatively, for example, in said stowed configuration, the respective second element of each said aerofoil profile of an uppermost said wing is set at a respective positive flap angle in a range +15° to +25°, and wherein the respective second element of each said aerofoil profile of an lowermost said wing is set at a respective positive flap angle in a range +1° to +10°.

Additionally or alternatively, for example, each said aerofoil profile has a first maximum spacing of the respective pressure surface from the chord line, and a second maximum spacing of the respective hinge axis from the chord line, wherein said first maximum spacing and said second maximum spacing are similar, for example within 10% of one another.

Additionally or alternatively, for example, for each said aerofoil profile, the respective said maximum thickness to chord ratio, and the respective said maximum absolute thickness to chord ratio have magnitudes that are within 10% of one another, for example 1% of the chord.

Additionally or alternatively, for example, for each said aerofoil profile, the respective said maximum thickness to chord ratio is in the range 0.10 to 0.14.

Additionally or alternatively, for example, for each said aerofoil profile, the respective said maximum absolute thickness to chord ratio is in the range 0.10 to 0.15.

Additionally or alternatively, for example, each said aerofoil profile has a respective said maximum thickness at a position less than 25% of the chord from the leading edge of the aerofoil profile.

Additionally or alternatively, for example, each said aerofoil profile has a respective said maximum thickness at a position about 20% of the chord from the leading edge of the aerofoil profile.

Additionally or alternatively, for example, each said aerofoil profile has a camber profile with a maximum camber of about 6% or less of the chord.

Additionally or alternatively, for example, wherein each said aerofoil profile, includes at least one of the following:
- the respective said gap varies between about 2.3% to about 1.2% of the chord, as the respective said flap angle increases from 0° to 30°;
- the respective said gap varies between about 2.3% to about 2.5% of the chord, as the respective said flap angle decreases from 0° to −20°.

Additionally or alternatively, for example, for each said aerofoil profile, the respective leading edge radius is about 2% of the chord.

Additionally or alternatively, for example, for each said aerofoil profile, the respective said primary element has a primary element trailing edge, and wherein the respective said secondary element has a secondary element leading edge includes one of the following:
- wherein the primary element trailing edge overlaps the secondary element leading edge by a longitudinal overlap in a direction parallel to the chord;
- wherein the primary element trailing edge overlaps the secondary element leading edge by a longitudinal overlap in a direction parallel to the chord, and, the respective said longitudinal overlap varies between about 5% to about 3% of the chord, as the respective said flap angle increases from 0° to 30°;
- wherein the primary element trailing edge overlaps the secondary element leading edge by a longitudinal overlap in a direction parallel to the chord, and, wherein for each said aerofoil profile, the respective said longitudinal overlap varies between about 5% to about 5.5% of the chord, as the respective said flap angle decreases from 0° to −20°.

Additionally or alternatively, for example, each said aerofoil profile is configured as a high lift aerofoil profile. For example, said aerofoil profile is configured as having a maximum lift coefficient of at least 2.5 at zero flap angle, or, said aerofoil profile is configured as having a maximum lift coefficient of greater than 2.3 at zero flap angle. Additionally or alternatively, for example, said maximum lift coefficient corresponds to an angle of attack of between about 15° and about 16°.

Additionally or alternatively, for example, said aerofoil profile is configured as having a lift coefficient of 1.0 corresponds to an angle of attack of about 0°.

Additionally or alternatively, for example, said aerofoil profiles of said two wings have an aggregate cross-sectional area corresponding to a said occupancy of between 40% and 30% of said envelope cross-sectional area.

Additionally or alternatively, for example, said envelope cross-sectional profile is in the form of a segment of a circle of predetermined diameter, the segment being defined by a corresponding arc portion and a corresponding chord portion. For example, for each said aerofoil profile, a respective first ratio of said chord to said diameter is in the range 70% to 87%. For example, for each said aerofoil profile, the respective first ratio is in the range 75% to 85%. Additionally or alternatively, for example, for each said aerofoil profile, a respective second ratio of said maximum thickness to said diameter is in the range 7% to 12%. Additionally or alternatively, for example, for each said aerofoil profile, a respective second ratio of said maximum absolute thickness to said diameter is in the range 8% to 14%.

Additionally or alternatively, for example, each said wing is configured with zero taper, and wherein each wing has a uniform said aerofoil profile along the respective span thereof. Alternatively, for example, each said wing is configured with non-zero taper, and wherein each wing has a uniform said aerofoil profile along the respective span thereof.

Additionally or alternatively, for example, the wing system is configured for selectively enabling the wings to transition from the stowed configuration to the pre-deployed configuration under predetermined conditions.

Additionally or alternatively, for example, the wing system is configured for maintain a negative said deflection angle for each aerofoil profile of each wing during deployment from the pre-deployed configuration through to the deployed configuration.

According to a second aspect of the presently disclosed subject matter, there is provided an air vehicle, comprising the wing system as defined above regarding the first aspect of the presently disclosed subject matter. For example, the air vehicle is a UAV.

According to a third aspect of the presently disclosed subject matter, there is provided a launch system comprising an air vehicle as defined above regarding the second aspect of the presently disclosed subject matter, accommodated in a fairing having an internal chamber defining said envelope, said envelope cross-sectional profile and said envelope cross-sectional area.

For example, the launch system is configured for selectively releasing said air vehicle from said fairing. For example, the launch system is configured for selectively transitioning the wing system from the stowed configuration to the pre-deployed configuration following release of said air vehicle from said fairing. For example, the launch system is configured for selectively transitioning the wing system from the pre-deployed configuration to the deployed configuration and for subsequently enabling aerodynamic flight of the air vehicle.

A feature of at least one example of the presently disclosed subject matter is that two element aerofoil profiles are provided for deployable wings for an air vehicle, in which in said stowed configuration, the respective second element of each said aerofoil profile of one said wing is set at a different flap angle as compared with the respective second element of each said aerofoil profile of the other said wing, thereby enabling maximizing occupancy of an envelope cross-sectional area in which it is desired to accommodate the wing system in stowed configuration. Such a feature can be of particular use in applications of the presently disclosed subject matter in which such an envelope cross-sectional area is semi-circular, or in the form of a segment or trapezium in which the two superposed aerofoil profiles in the stowed configuration can have different-sized widths of the envelope for being accommodated therein.

Another feature of at least one example of the presently disclosed subject matter is that two element aerofoil profiles are provided for deployable wings for an air vehicle, in which the respective second element of each said aerofoil profile of one said wing and the respective second element of each said aerofoil profile of the other said wing have to be pivoted to a different flap angle to that corresponding to the stowed configuration, to enable the wings to deploy from the pre-deployed configuration to the deployed configuration.

Another feature of at least one example of the presently disclosed subject matter is that two element aerofoil profiles are provided for deployable wings for an air vehicle, in which a high degree of flexibility can be applied to the design of the two element aerofoil profiles, including maximum absolute thickness, maximum aerofoil thickness, leading edge radius, camber, location of flap hinge point, and flap angle, wherein to enable for efficient packaging within an envelope provided by a fairing, while providing high lift and endurance characteristics, as well as mission adaptive features via flap deflection settings for take-off and landing, cruise, loiter, and so on.

Another feature of at least one example of the presently disclosed subject matter is that two element aerofoil profiles are provided for deployable wings for an air vehicle, in which it can be possible to extend the flight envelope, particularly in the low speed range, by providing high lift characteristics, for example including a reduced thickness to chord ratio.

Another feature of at least one example of the presently disclosed subject matter is that two element aerofoil profiles are provided for deployable wings for an air vehicle, in which the aerofoil profiles have high lift and long endurance characteristics.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 5(a) illustrates a reference datum slotted aerofoil section, and FIG. 5(b) illustrates the slotted aerofoil section of FIG. 3.

DETAILED DESCRIPTION

Figure 1:
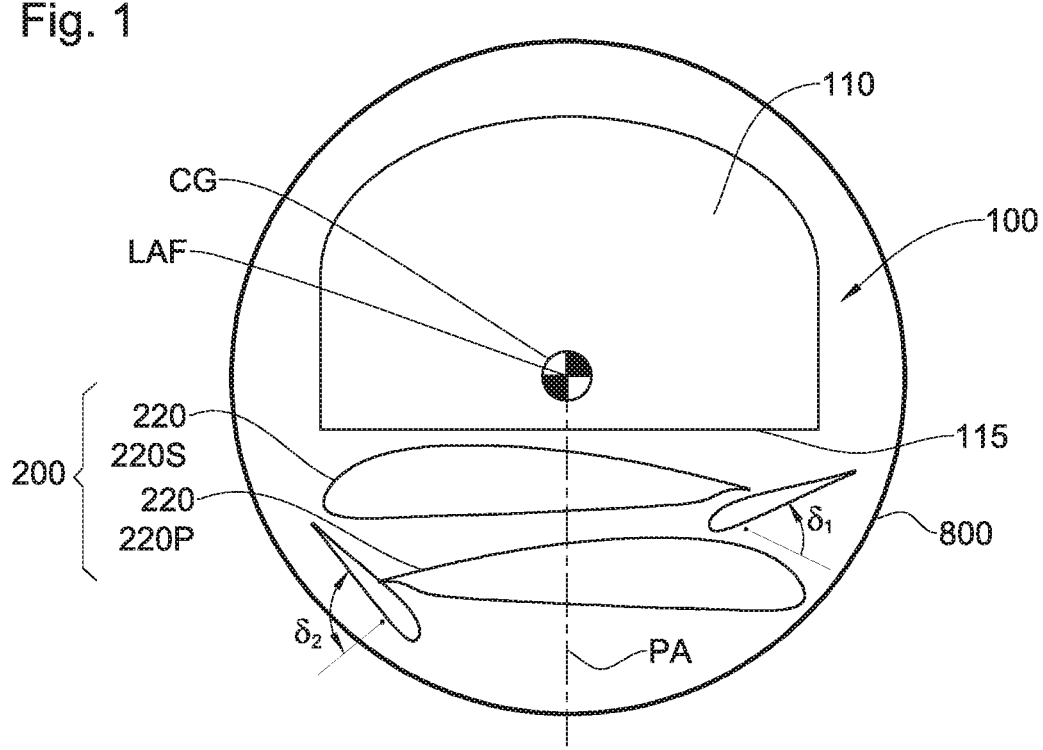
FIG. 1 is a transverse cross-sectional view of an air vehicle according to a first example of the presently disclosed subject matter, in the stowed configuration accommodated in a fairing.
Figure 1A:
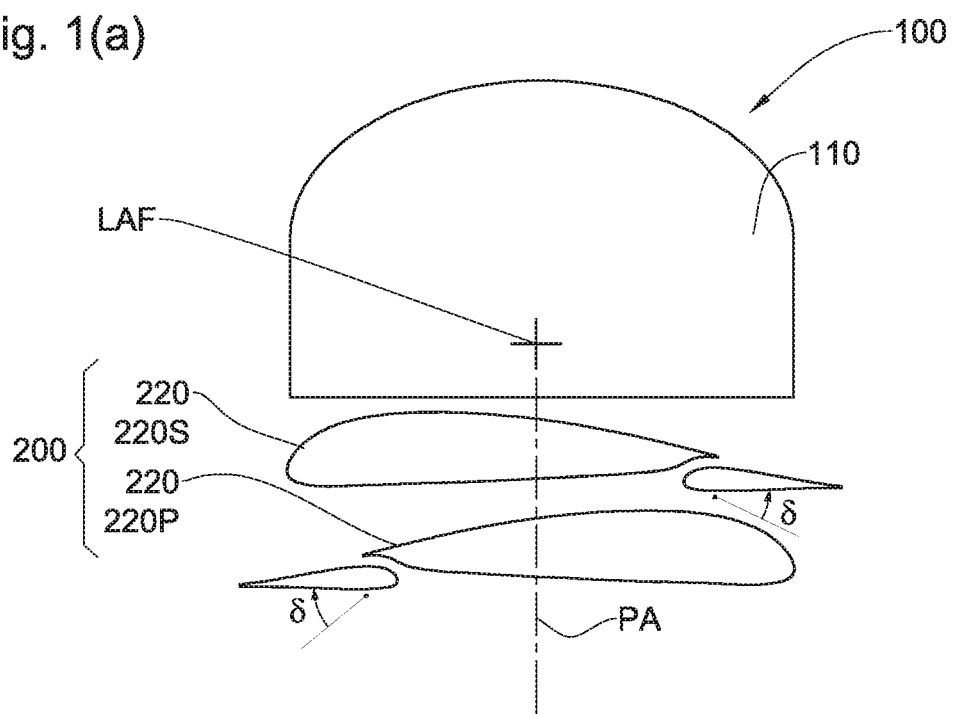
FIG. 1(a) is a transverse cross-sectional view of the air vehicle according to the example of FIG. 1, in the pre-deployed configuration.
Figure 2:
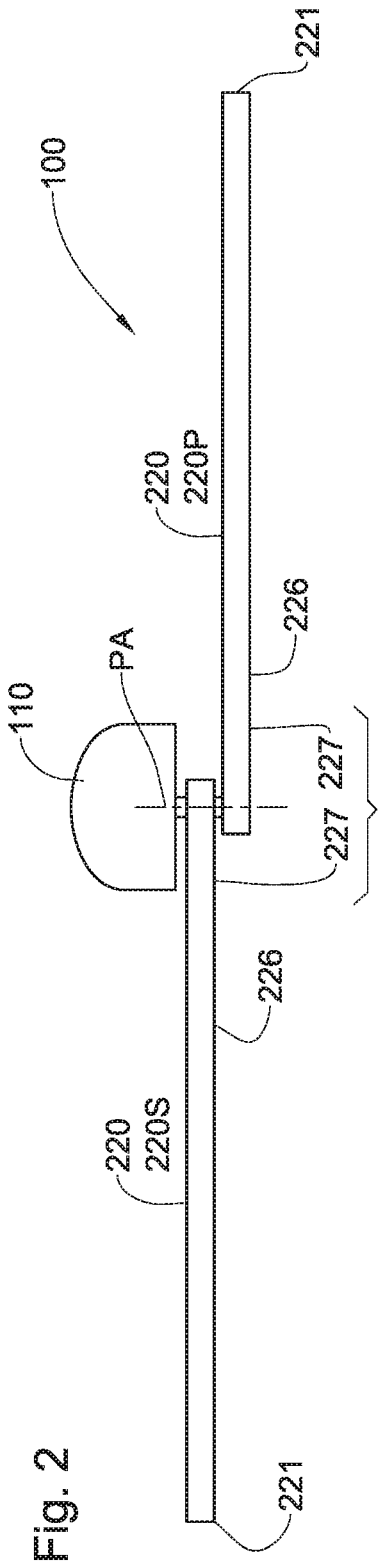
FIG. 2 is a transverse cross-sectional view of the air vehicle according to the example of FIG. 1, in the deployed configuration.

Referring to FIGS. 1, 1(a) and 2, an air vehicle according to a first example of the presently disclosed subject matter, generally designated 100, comprises a wing system 200, which is per se novel.

In at least this example, the air vehicle 100 is a powered, fixed-wing type air vehicle, comprising a subsonic configuration, having a fuselage section 110 (also referred to herein as the fuselage 110), said wing system 200, a suitable propulsion system (not shown), and an empennage (not shown)—for example (but not limited to) including a tailplane and vertical stabilizers. Furthermore, while the presently disclosed subject matter finds particular application in UAV aircraft, the presently disclosed subject matter can also be applied to manned aircraft, mutatis mutandis, in particular to general aviation, subsonic transport, naval aviation, and so on, for example. In alternative variations of this example, and in other examples, the air vehicle 100 can instead be configured as an un-powered, fixed-wing type subsonic air vehicle, manned or unmanned.

The air vehicle 100 further comprises a control system comprising a controller (not shown) configured for operating the air vehicle 100 at least within the flight envelope thereof.

As will become clearer herein, the wing system 200 has a stowed configuration SC, a pre-deployed configuration PC and a deployed configuration DC.

The wing system 200 comprises two wings 220, in particular a port wing 220P and a starboard wing 220S. Thus, unless otherwise specified herein, the reference numeral 220 shall also refer to each one of the port wing 220P and the starboard wing 220S.

Each said wing 220 is pivotably mounted to the fuselage 110 about a respective pivot axis PA, thereby enabling the wings 220 to each pivot about its respective axis PA between the respective pre-deployed configuration PC and the respective deployed configuration DC. While in at least this example, the respective pivot axes PA of the two wings 220 are coaxial, in alternative variations of this example, and in other examples, respective pivot axes PA of the two wings 220 are not coaxial—for example parallel and spaced, or non-parallel and spaced. Examples of suitable mechanisms for providing such pivoting, including actuation systems therefor, are known in the art.

In at least this example, the pivot axis PA of each wing 220 is parallel to the yaw axis of the air vehicle 100.

The port wing 220P and the starboard wing 220S are essentially mirror images of one another, and are otherwise substantially identical with the exception that at least in this example, a portion of each wing 220 in the vicinity of the respective pivot axis PA are in superposed configuration with respect to one another.

In at least this example, the air vehicle 100 is configured for being accommodated in a fairing 800, while the wing system 200 is in the stowed configuration SC. For example, such a fairing 800 enables the air vehicle 100 to be isolated from aerodynamic forces as the air vehicle 100 is accelerated to required speed and altitude, and/or such a fairing can protect the air vehicle while in storage or while being transported. For example the air vehicle 100 can be accelerated to required speed and altitude via an external launch system, for example a launch barrel, or for example via a booster rocket (as a payload thereof for example), or for example can be delivered to required altitude and required speed via a carrier air vehicle.

The fairing 800 has an internal profile and fairing cross-sectional areas at transverse planes orthogonal to the longitudinal axis LAF of the fairing such as to enable the respective transverse cross-sections of the air vehicle 100 (i.e., the respective external profiles and transverse cross-sectional areas of the air vehicle 100) to be accommodated therein. In at least this example, fairing 800 has a substantially uniform internal profile and a substantially uniform cross-sectional area at transverse planes orthogonal to the longitudinal axis LAF for at least cross-sections of the air vehicle which include the wings 220 in the stowed configuration SC. The longitudinal axis LAF of the fairing is generally defined at the centerline of the fairing.

It is to be noted that at least for some implementations of this example in which the acceleration of the air vehicle 100 (while accommodated in the fairing 800 in a respective assembly) is achieved by applying a force to the assembly (for example a thrust force via a booster rocket, or as a result of being fired from a launch barrel), there can be advantages in having such a force aligned with the fairing longitudinal axis LAF, in particular the centerline of the fairing. In at least such cases there can also be corresponding advantages in having the center of gravity CG of the air vehicle 100 also lying on the fairing longitudinal axis LAF (FIG. 1), in particular on the centerline of the fairing. For example, such an arrangement can minimize or eliminate risk of nutation. In at least some such cases, the air vehicle 100 can be configured such that the center of gravity CG thereof is accommodated within the fuselage 110. Thus at transverse cross-sections along the fairing longitudinal axis LAF, the respective cross-section of the fuselage 110 occupies more than half of the respective internal cross-section of the fairing 800, while the two wings 220 (in the stowed configuration SC) occupy less than half of the internal cross-section of the fairing 800. In at least some such cases, the fuselage 110 has greater mass than the wings 220. As will become clearer herein, according to an aspect of the presently disclosed subject matter, the maximum absolute thickness ABS of the wings can be minimized to enable fitting of the two wings 220 in the smallest possible part of the internal volume provided by the fairing 800 to thereby enable maximization of the fuselage cross-section, and thereby maximize payload capacity or the air vehicle 100, for example.

In at least the example of FIG. 1, the wings 220 are below the fuselage, that is, the suction surface of the uppermost wing 220 (for example the starboard wing 220S) of the wing system 200 is facing a bottom portion 115 of the fuselage 110. However, in at least one alternative variation of the example of FIG. 1, and referring now to FIG. 13, the wings 220 can be above the fuselage, that is, the pressure surface of the lowermost wing 220 (for example the port wing 220P) of the wing system 200 is facing an upper portion 116 of the fuselage 110.

Figure 3:
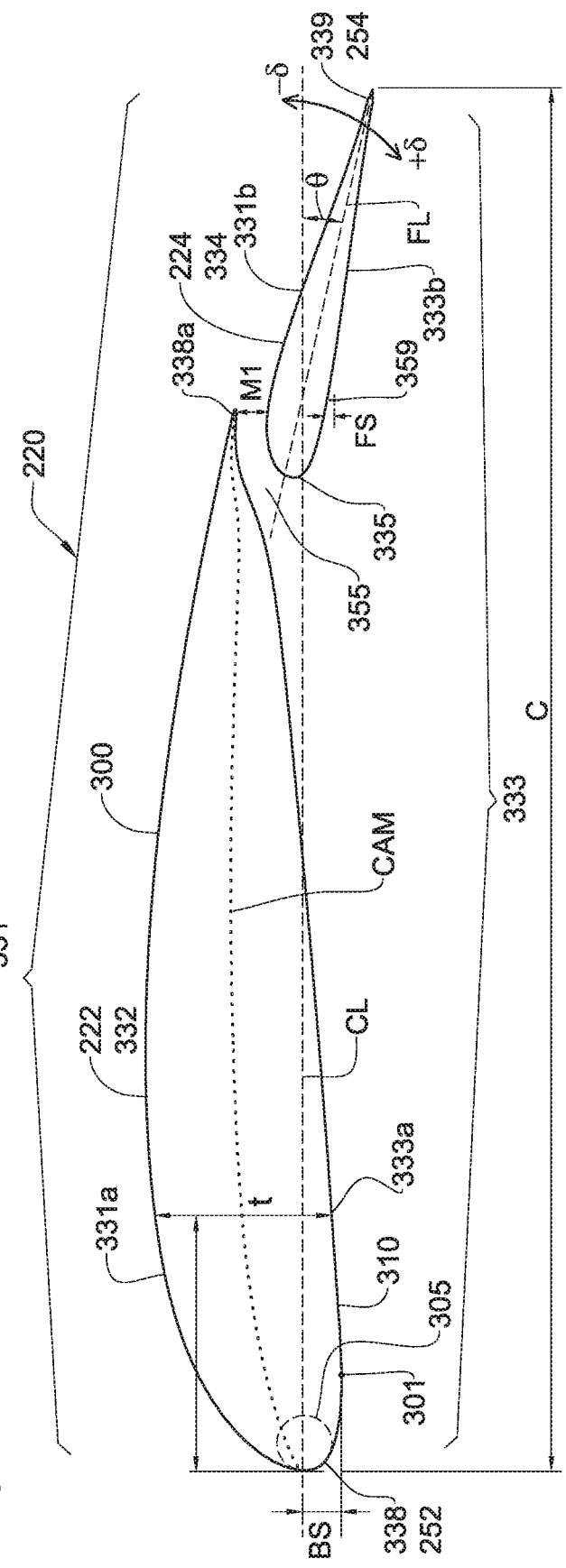
FIG. 3 illustrates a slotted aerofoil section on which the wings of the air vehicle according to the example of FIG. 1 is based.

Referring also to FIG. 3, each wing 220 is based on (i.e., the wing 220 comprises a plurality of aerofoil sections each corresponding to) a two-element slotted aerofoil 300, also interchangeably referred to herein as SA aerofoil or SA aerofoil 300, in particular exhibiting high lift characteristics. In other words, each wing 220 comprises a plurality of aerofoil sections each corresponding to the two-element slotted aerofoil 300.

Herein, the term "slotted aerofoil" (SA-aerofoils)—generally refers to two-element aerofoils (also referred to herein as dual element aerofoils) composed of a first or primary element—the main aerofoil body—and a second or secondary element, for example in the form of a flap or aileron. The second element of SA-aerofoils is separated from the main body by a slot which is substantially open for the airflow at any deflection of the flap. A feature of slotted aerofoil type structures is that this type of structure facilitates actuation of the second element through positive or negative deflection angles. Another feature of this type of structure is that a box-like relatively rigid construction may be achieved. In general, when the second aerofoil element is coupled to actuators, the SA-aerofoils can provide features of adjustable geometry and have built-in options for operating as take-off/landing flaps, ailerons, airbrakes and for providing decambering at maximum speed flight. SA-aerofoils can include mission-adaptive, two-element, high-lift arrangements, and are inherently high-lift aerofoils that are particularly suitable for development of long endurance UAV and other aircraft, loitering at high lift coefficients. Such SA-aerofoils can be designed for cruising/loitering flight at high lift coefficients, and optionally rely on a second element rotation around external hinge point for adjustment of the aerofoil to different flight regimes.

In implementations of this example in which the wings 220 are in plan form generally rectangular, the SA aerofoil 300 is uniform in size and profile along the respective span of the wing 220.

In implementations of this example in which the wings 220 are in plan form generally trapezoidal (i.e., having a taper) or any other shape, the SA aerofoil 300 is uniform in profile along the respective span of the wing 220, but the size of the SA aerofoil 300 at each span-wise position along the span of the respective wing changes in proportion to the size of the chord C at the respective span-wise position.

In at least one of the above implementations the respective thickness to chord ratio along the respective span of the wing 220 can be uniform.

In at least one variation of the above implementations the respective thickness to chord ratio along the respective span of the wing 220 can be non-uniform. For example, respective thickness to chord ratio along the respective span can be reduced in a direction from the respective wing root to wing tip. In such cases, and according to an aspect of the presently disclosed subject matter, the respective maximum thickness to chord ratio between the wing root and wing tip is still maintained within a range that provides the respective AS aerofoil 300 with high lift characteristics. For example such a range can be 10% to 14%. In at least some such cases, there can be advantages in having a relatively thin wing tip (as compared with the wing root).

Aerofoil 300 comprises a first or primary element 332 (also referred to interchangeably herein as the "main body of the aerofoil", or as the "main body"), and a pivotable second or secondary element 334 (also referred to interchangeably herein as the "aerofoil flap", or as the "flap"). Thus, correspondingly, each wing 220 has a primary wing portion (also referred to herein as the main wing portion) 222, corresponding to the primary elements 332 of the aerofoils 300, and a secondary wing portion (also referred to herein as the flap portion) 224, corresponding to the secondary elements 334 of the aerofoils 300. In at least this example, the two element structure of each wing 220, i.e., the respective primary wing portion 222 and the respective secondary wing portion 224, generally extend from the wing tip 221 to the wing root 226 (FIG. 2), while portions 227 of the wings 220, in-board of the wing roots 226 and that remain in overlapping relationship with the fuselage 110 in the deployed configuration DC, do not require any aerodynamic profile, nor the two-element wing structure.

The primary element 332 comprises the leading edge 338 of the SA aerofoil 300, which coincides with the leading edge 252 of the respective wing 220. The primary element 332 also comprises major portions 331a, 333a, of the suction surface 331 and pressure surface 333, respectively, of the SA aerofoil 300. The primary element 332 also comprises a trailing end 338a, also referred to interchangeably herein as the trailing edge of the primary element 332.

The secondary element 334 is configured as single continuous flap segment, and comprises the trailing edge 339 of the SA aerofoil 300, which coincides with the trailing edge 254 of the wing 220. The secondary element 334 also comprises minor portion 331b, 333b, of the suction surface 331 and pressure surface 333 of the SA aerofoil 300, respectively.

The SA aerofoil 300 comprises chord C, defined along chord line CL, which corresponds to the angle of attack α of zero for the SA aerofoil 300. In other words, the chord line CL is generally parallel to the longitudinal axis of the air vehicle 100 or is at a desired inclination angle to the longitudinal axis of the air vehicle 100, and/or, the chord line CL is generally parallel to the roll axis of the air vehicle 100 or is at a desired inclination angle about the pitch axis of the air vehicle 100.

It is to be noted that in at least some implementations of the above example, the chord line CL can be set at a desired inclination angle to the longitudinal axis of the air vehicle 100, such that when the wings 220 are deployed from the pre-deployed configuration PC to the deployed configuration DC, the wings 220 automatically have the desired inclination to the longitudinal axis of the air vehicle 100, without the need to manipulate the wings 220 other than pivoting of the wings about the pivot axes PA. In other words, in the pre-deployed configuration PC, and correspondingly in the stowed configuration SC, the wings 220 can be oriented relative to one another and relative to the pivot axes PA such that the wings 220 automatically provide the desired inclination to the longitudinal axis of the air vehicle 100 in the deployed configuration DC.

The secondary element 334 is pivotable about hinge point 359 (also referred to interchangeably herein as the hinge axis) to provide a range of positive and negative deflection angles δ for the secondary element 334 with respect to the primary element 332.

The deflection angle δ is also referred to interchangeably herein as flap deflection angle δ or as flap angle δ.

The deflection angle δ of the secondary element 334, is defined with respect to a flap datum line FL, which is at angle θ to the chord line CL, i.e., in which the leading end 335 is vertically higher than the trailing edge 339, in the view of FIG. 3. In other words, a deflection angle δ of zero for the secondary element 334 corresponds to the secondary element 334 being aligned with flap datum line FL.

Figure 3A:
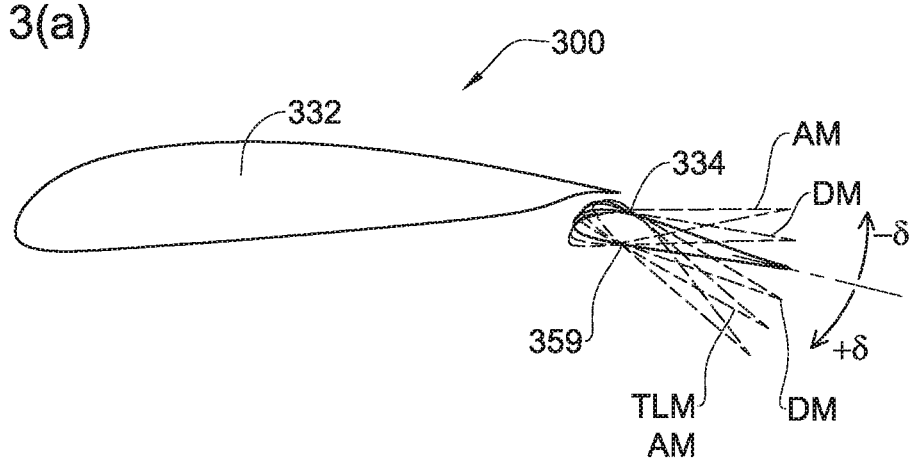
FIG. 3(a) schematically illustrated flap deflections of the flap of the aerofoil of FIG. 3.

Referring also to FIG. 3(a), positive deflection angle δ corresponds to the flap datum line FL being at an angle greater than angle θ to the chord line CL (i.e., the secondary element 334 pivots about hinge point 359 in a clockwise direction in the view of FIG. 3), while negative deflection angle δ corresponds to the flap datum line FL being at an angle smaller than angle θ to the chord line CL (i.e., the secondary element 334 pivots about hinge point 359 in a counter clockwise direction in the view of FIG. 3).

It is to be noted that in at least some implementations of the above examples, the position of the chord line CL with respect to the aerofoil 300 such as to corresponds to the angle of attack α of zero for the SA aerofoil 300 can also be chosen such that at zero deflection angle δ the coefficient of lift $C_1$ for the aerofoil is 1.0, while at the same time allowing for the second element 334 to be pivoted to deflection angles δ in an "aerodynamic" range of up to ±20° or up to ±25°, for example, for enabling aerodynamic operation second element 334. By "aerodynamic operation second element 334" is meant that at the respective deflection angles δ in the aforesaid aerodynamic range, attached flow is maintained over the aerofoil 300, and furthermore that efficient control is provided by the aerofoil 300—i.e., within the aforesaid aerodynamic range, changes in deflection angle δ provide corresponding controlled changes in the coefficient of lift $C_1$ for the aerofoil 300. It is also to be noted that in such implementations of the above examples, the position of the chord line CL with respect to the aerofoil 300 such as to provide reduced drag at cruise, and a maximum coefficient of lift $C_1$ at zero deflection angle δ that is consistent with high lift performance, i.e., a maximum coefficient of lift $C_1$ of more than 2.2, for example 2.3 or more, at such conditions. In yet other alternative variations of this example, the "aerodynamic" range can be up to ±30°, for example.

In at least some implementations of the above examples, the angle θ can be about 12°.

In yet other implementations of the above examples, the angle θ can be in the range of about 8° to about 16°. In such examples where the angle θ is less than 12°, for example between 8° to less than 12°, the range of positive/negative deflection angles for enabling aerodynamic operation of the second element 334 can change to an aerodynamic range of between more than +20° to less than −20° (for example up to +24°/−16°), as compared with ±20° for the example of FIG. 3, or to an aerodynamic range of between more than +25° to less than −25° (for example up to +29°/−21°), as compared with ±25° for the example of FIG. 3. In such examples where the angle θ is more than 12°, for example between more than 12° to 16°, the range of positive/negative deflection angles δ for enabling aerodynamic operation of the second element 334 can change to to an aerodynamic range of between less than +20° to more than −20° (for example up to +16°/−24°), as compared with ±20° for the example of FIG. 3, or to an aerodynamic range of between less than +25° to more than −25° (for example up to +21°/−29°), as compared with ±25° for the example of FIG. 3.

Figure 14:
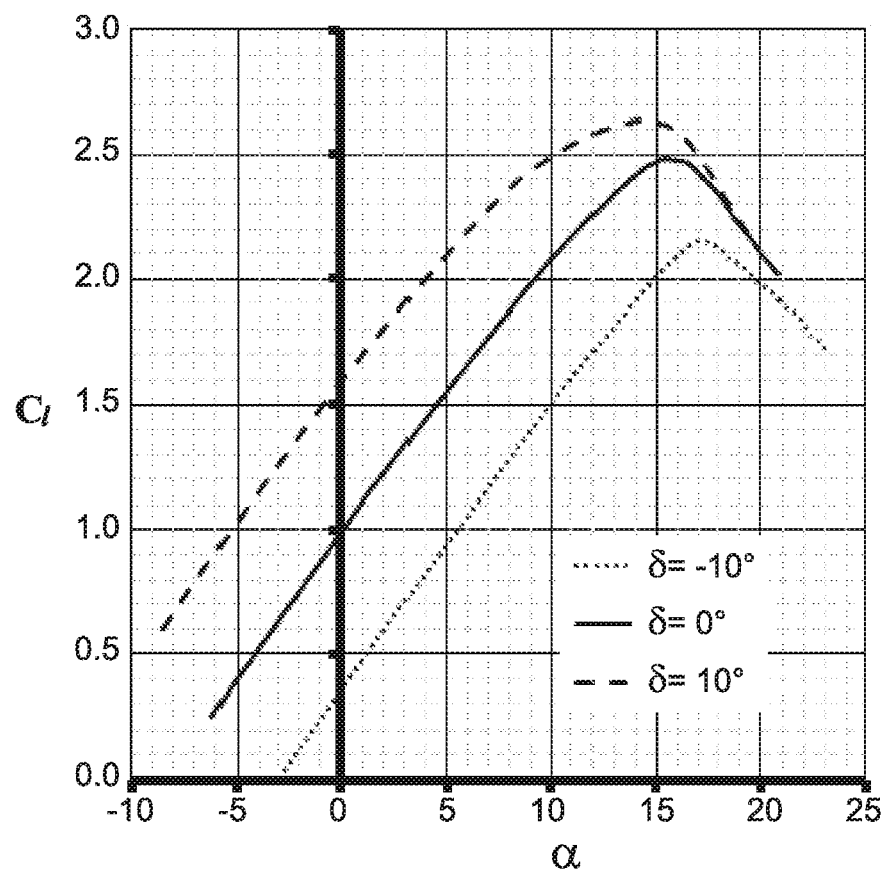
FIG. 14 schematically compares the lift coefficient distributions of the airfoil of the example of FIG. 3 with angle of attack, at zero flap angle, at +10° flap angle, and at −10° flap angle.

Referring to FIG. 14, at flap deflection angle δ of 0°, at least in this example the SA aerofoil 300 exhibits a maximum coefficient of lift of about 2.5 at an angle of attack α of about 15° to 16°, while the coefficient of lift is about 1.0 at angle of attack α of about 0°, trailing off to $C_l$ of about 2.1 at angle of attack α of about 20°. For the same aerofoil 300, at a positive flap deflection angle δ of +10°, the SA aerofoil 300 exhibits a maximum coefficient of lift of over 2.6 at an angle of attack α of about 14° to 15°, while the coefficient of lift is about 1.6 at angle of attack α of about 0°, trailing off to $C_l$ of about 2.1 at angle of attack α of about 20°. For the same aerofoil 300, at a negative flap deflection angle δ of −10°, the SA aerofoil 300 exhibits a maximum coefficient of lift of about 2.15 at an angle of attack α of about 17°, while the coefficient of lift is about 0.4 at angle of attack α of about 0°, trailing off to $C_l$ of about 2.0 at angle of attack α of about 20°.

It is to be noted that at least in this example, the second element 334 can be pivoted to deflection angles δ in an aerodynamic range of at least up to ±20° or up to ±25°, for example, for enabling aerodynamic operation of the second element 334. Nevertheless in at least this example it is also possible to pivot the second element 334 to deflection angles δ over a "mechanical range" that is higher than the aerodynamic range of up to ±20° or up to ±25°. Such a mechanical range can be limited by mechanical constraints. For example the mechanical negative deflection angle δ limit for the example of FIG. 3 is about −72°, at which negative deflection the suction surface of the second element 334 abuts the trailing end of the first element 332. In this example the mechanical positive deflection angle δ limit is over 90°, at which positive deflection the trailing edge of the second element 334 abuts the pressure surface of the first element 332. In alternative variations of this example, the mechanical range for deflection angles δ can be any one of: +90° to −90°; +90° to −80°; +90° to −70°; +90° to −60°; +80° to −90°; +90° to −80°; +80° to −70°; +80° to −60°; +70° to −90°; +70° to −80°; +70° to −70°; +70° to −60°; +60° to −90°; +60° to −80°; +60° to −70°; +60° to −60°; +50° to −90°; +50° to −80°; +50° to −70°; +50° to −60°.

It is to be noted that the actuator for each secondary element 334 can be matched to the required range (including the required aerodynamic range and the required mechanical range for the specific wing 220) of positive and negative deflection angles.

Figure 3B:
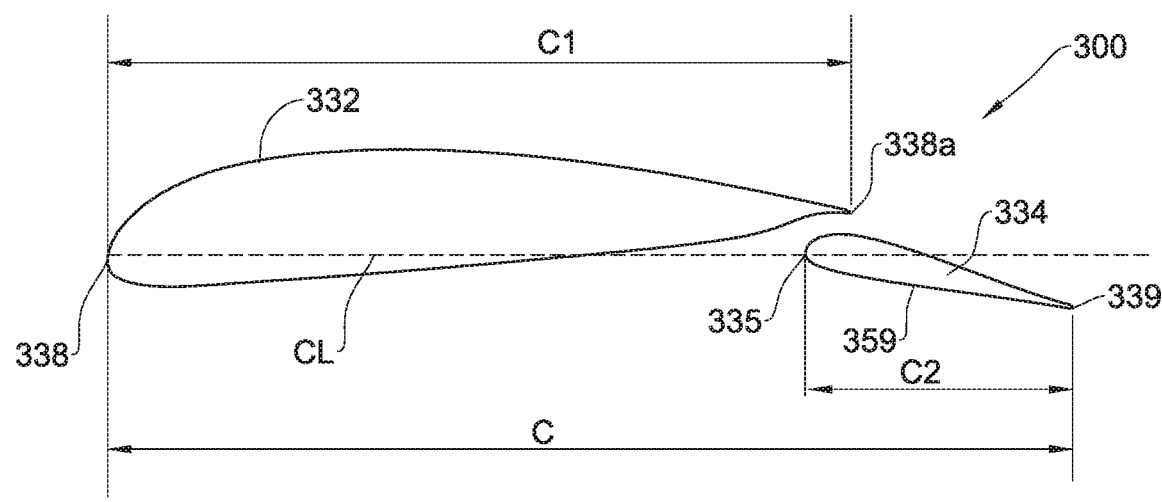
FIG. 3(b) shows relative sizes of the primary element and the secondary element of the aerofoil of FIG. 3.

Referring to FIG. 3(b), in at least this example, the primary element 332 has a primary chord C1 of about 77% of the chord C, wherein primary chord C1 is defined as the spacing between the leading edge 338 and the trailing end 338a, taken along a direction parallel to the chord line CL. Also in at least this example, the secondary element 334 has a secondary chord C2 of about 27.5% of the chord C, wherein the secondary chord C2 is defined as the spacing between the leading end 335 and the trailing edge 339, taken along a direction parallel to the chord line CL, when the secondary element 334 is at deflection angle δ of 0°. In alternative variations of this example, and in other examples, the primary element 332 can have a primary chord C1 with respect to the chord C, within any one of the following ranges: 70% to 80%; 65% to 85%; 75% to 80%. In this or other alternative variations of this example, and in other examples, the secondary element 334 can have a secondary chord C2 with respect to the chord C, within any one of the following ranges: 20% to 30%; 25% to 35%; 25% to 30%.

A slot 355 separates the leading end 335 of the secondary element 334 (also referred to interchangeably herein as the leading edge of the secondary element 334) from the trailing end 338a of the primary element 332.

For example, the slot 355 can have an exit width of about 2.3% of the aerofoil chord C in a non-deflected position of the flap element, i.e., at deflection angle δ of zero.

Without being bound to theory, the inventors believe that the airflow through slot 255 provides enhanced efficiency and linearity of the aerodynamic characteristics of the aerofoil as compared to a similar non-slotted aerofoil, and provides or enhances high lift characteristics to the aerofoil, and/or, provides or enhances flap efficiency characteristics to the aerofoil.

Referring in particular to FIG. 3(a), the deflection angle δ of the secondary element 334 generally depends on the particular mode of operation of the wing 220. For example, in cruise/loiter mode~deflection angle δ=0°; take-off/landing mode TLM~deflection angle δ=+20 to +25°; aileron mode AM~deflection angle δ=+20° to +25°; maximum speed decambering mode DM~negative flap deflection, deflection angle δ=−10° to −15°.

The precise form and size of the slot 355 can generally vary with deflection angle δ of the secondary element 334, and thus generally depends on the particular mode of operation of the wing 220.

Furthermore, in at least this example, in the stowed configuration SC, the deflection angle δ can be between +20° and −60°.

For example, in at least one implementation of the above example, and referring again to FIG. 1, one wing 220 (for example the starboard wing 220S) can have a deflection angle δ (annotated as angle δ1 in FIG. 1) of about −30°, for example −32°, while the other wing 220 (for example the port wing 220P) can have a deflection angle δ (annotated as angle δ2 in FIG. 1) of about −60°. For example, in at least one other implementation of the above example, and referring again to FIG. 13, one wing 220 (for example the starboard wing 220S) can have a deflection angle δ (annotated as angle δ1' in FIG. 13) of about +20°, while the other wing 220 (for example the port wing 220P) can have a deflection angle δ (annotated as angle δ2' in FIG. 13) of about +5°.

Furthermore, in at least this example, and referring to FIG. 1(a), in the pre-deployed configuration PC, the deflection angle δ can be identical to one another, for example between −10° and −15°.

Referring again to FIG. 3, the hinge point 359 of the secondary element 334 is spatially fixed with respect to the SA aerofoil 300. In particular, the hinge point 359 of the secondary element 334 is spatially fixed at an outwardly displaced position with respect to the lower (pressure) surface of the secondary element 334. In at least this example, the spacing FS is minimized, in order to enable minimizing the value of the maximum absolute thickness ABT of the aerofoil 300, and thus the hinge point 359 is as close as possible to the secondary element 334. In alternative variations of this example, and in other examples, the hinge point 359 can be enclosed within the secondary element 334.

In yet other alternative variations of this example, and in other examples, the hinge point 359 can be facing the suction surface of the secondary element 334, i.e. the respective minor portion 331b of the suction surface 331.

Preferably, the hinge point 359 is further located with respect to the second element 334 such that: the second element 334 is aerodynamically stable relative to the hinge point 359 (that is that the hinge point is preferably forward of the aerodynamic center of the second element 334); actuator loads are minimized if possible.

For example, spacing FS is less than 50% of the maximum thickness of the secondary element 334. For example, spacing FS can be any one of: 40%, 30%, 20%, 10%, 5%, 1%, 0%, of the maximum thickness of the secondary element 334.

A suitable actuation mechanism (not shown) is provided for actuating the secondary element 334 to adopt the range of positive and negative deflection angles desired, including the aforesaid aerodynamic range as well as the aforesaid mechanical range.

In alternative variations of this example, the secondary element 334 can instead be formed as a slotted flap segment, rather than as a continuous flap segment. In such an example, the slotted flap segment can have a slotted flap construction, comprising two or more sub-elements, rigidly connected to one another and separated by minor slot, such that the secondary element still rotates about hinge point 359 as a rigid body.

It is to be noted that the leading edge 338 is also rounded, having a leading edge radius 315, for providing enhanced high lift characteristics. For example, the leading edge radius 315 can be greater than 1.7% of the chord C. In this example, the leading edge radius 315 is about 2% of the chord C.

It is also to be noted that the leading end 335 is also rounded, to enable a wide deflection range of deflection angles δ while maintaining attached flow over the second element 334.

Figure 4:
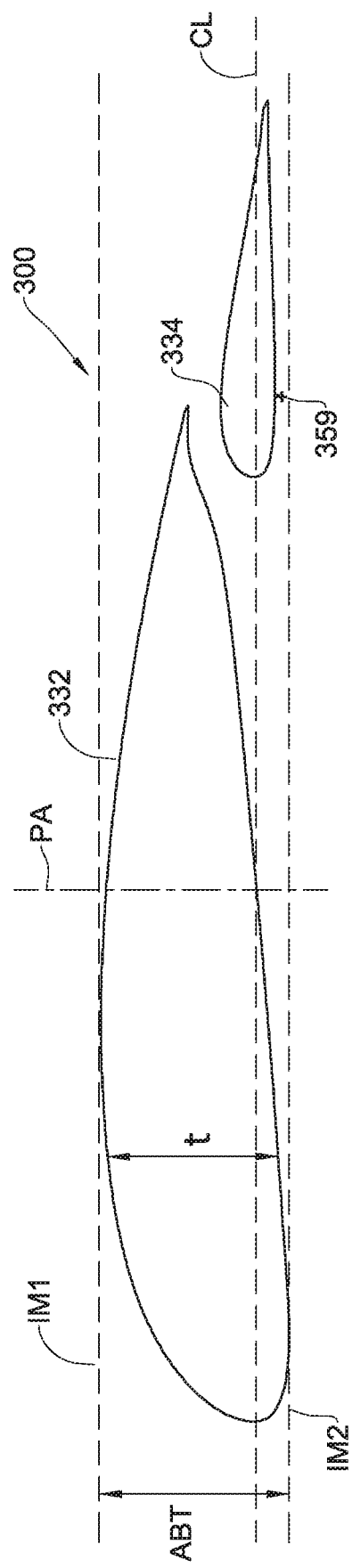
FIG. 4 schematically illustrates a geometric relationship between maximum absolute thickness and aerofoil thickness of the slotted aerofoil section of FIG. 3.

Referring in particular to FIG. 4, which illustrates the aerofoil 300 in the pre-deployed configuration PC, it is to be noted that the SA aerofoil 300 also has a minimum value for maximum absolute thickness ABT that is similar in magnitude to the maximum thickness t of the SA aerofoil 300.

By "maximum absolute thickness" is meant the maximum spacing, taken along a direction parallel with the respective pivot axis PA, between any point on the upper part of the SA aerofoil 300 with respect to any point on the lower part of the SA aerofoil 300, including the hinge point 359.

Such a maximum absolute thickness can be minimized for a given profile of the SA aerofoil 300 to provide the minimum value for maximum absolute thickness ABT, by pivoting the secondary element 334 about the hinge point 359 to a suitable negative deflection angle δ such as to minimize the spacing of any part of the secondary element 334 from the chord line CL in a direction parallel with the respective pivot axis PA (and extending in a downward direction in the view of FIG. 3). For example, such a suitable negative deflection angle δ can be similar to the value of the angle θ. For example, such a suitable negative deflection angle δ can be for example in the range −10° to −15°.

In at least this example, when the deflection angle δ is zero for the secondary element 334, the trailing edge 339 is below the hinge point 359, while when the deflection angle δ is negative such as to provide the minimum value for maximum absolute thickness ABT, the trailing edge 339 is above the hinge point 359.

In at least this example, in which the hinge point 359 is spaced away from the pressure surface of the secondary element 334 by spacing FS, the aforesaid suitable negative deflection angle δ is such that all parts of the secondary element 334 are closer to the chord line CL than the hinge point 359. In at least this position, this position of the secondary element 334 is referred to as the pre-deployed position of the secondary element 334, corresponding to the pre-deployed configuration PC.

Such a minimum value for maximum absolute thickness ABT can be further minimized for a given chord C of the SA aerofoil 300, by controlling one or more of the camber, the spacing of the lowest point 301 of the pressure "belly" 310 of the aerofoil 300 from the chord line CL, and maximum aerofoil thickness t.

For example, by lowering the camber of the aerofoil 300, the minimum value for maximum absolute thickness ABT can be reduced.

For example, by lowering the spacing of the lowest point 301 of the pressure "belly" 310 of the aerofoil 300 from the chord line CL, the minimum value for maximum absolute thickness ABT can be reduced.

For example, by lowering the maximum thickness of the aerofoil 300, the minimum value for maximum absolute thickness ABT can be reduced.

On the other hand, lowering the camber of the aerofoil 300, and/or, lowering the spacing of the lowest point 301 of the pressure "belly" 310 of the aerofoil 300 from the chord line CL, and/or, lowering the maximum thickness of the aerofoil 300, can lead to lowering of the leading edge radius, that conventionally runs counter to general principles when designing a high-lift two element aerofoil.

Referring to FIG. 3, in at least this example, the spacing BS of the pressure belly lowermost point 301 from the chord line CL of the aerofoil 300, and the spacing of the flap hinge point 359 from the chord line CL of the aerofoil 300, are similar in magnitude.

In at least this example, for each aerofoil profile 300, the respective maximum thickness to chord ratio, and the minimum value for the respective maximum absolute thickness to chord ratio have magnitudes that are within 10% of one another. For example at least in this example, the respective maximum thickness to chord ratio, and the minimum value for the respective maximum absolute thickness to chord ratio have magnitudes that are within 1% of the chord C.

In at least this example, for each aerofoil profile 300, the respective maximum thickness to chord ratio is in the range 0.10 to 0.14, for example.

In at least this example, for each aerofoil profile 300, the respective maximum absolute thickness to chord ratio is in the range 0.10 to 0.15, for example.

In at least this example, each aerofoil profile 300, in particular the primary element 332 thereof, has a maximum camber of about 6% of the chord C. The camber for the aerofoil profile 300, in particular the primary element 332 thereof, can be determined as Δy/chord C, with respect to a cartesian coordinate system, wherein for each spacing x from the leading edge 338 (i.e., each x-coordinate), the value of Δy is determined from the following expression:

$$\Delta y = (y_{upper}(x) + y_{lower}(x))/2$$

wherein $y_{upper}(x)$ is the y-coordinate of the upper (suction) surface of primary element 332, and wherein $y_{lower}(x)$ is the y-coordinate of the lower (pressure) surface of primary element 332. Other ways of defining the camber are of course possible. For example, the camber measured this way can change when applying an inclination angle to the chord line CL.

Essentially, and referring in particular to FIG. 3 and FIG. 4, in at least this example, the minimum value of the maximum absolute thickness ABT of the SA aerofoil 300 is actually the minimum height that the aerofoil 300 can adopt, i.e., along a direction parallel to the pivot axis PA. The minimum value of maximum absolute thickness ABT is thus the spacing between a first imaginary line IM1 that tangentially touches the uppermost part of the aerofoil 300, and a second imaginary line IM2 that tangentially touches the lowermost part of the aerofoil 300 including the hinge point 359. In at least this example, the lowermost part of the aerofoil 300 is the hinge point 359 (when the secondary element 334 is at the respective pre-deployed position), but in alternative variations of this example, the hinge point 359 can be closer to the chord line CL, and thus the lowermost part of the aerofoil 300 can be instead the lowest point 301 of the pressure "belly" 310 of the aerofoil 300. The pressure belly 310 can be defined as a portion or point of the primary element 332 that is the most spaced below the chord line CL as seen in the view of FIG. 3.

Thus, the minimum value of maximum absolute thickness ABT of the SA aerofoil 300 is the minimum spacing (in a direction parallel to the pivot axis PA) that is required to be free of obstacles so that the respective wing 220 and aerofoil 300 can pivot about the respective pivot axis PA without colliding with any such obstacles, for example the other wing 220 during deployment from the pre-deployed configuration PC to the deployed configuration DC.

Referring also to FIGS. 5(a) to 10(b) the SA profile 300 can be compared with a reference aerofoil profile DA, for example as follows.

The datum aerofoil DA is a well known high lift, long endurance two-element aerofoil, for example the Heron tip aerofoil as disclosed in the following publications:

"Aerodynamic Concept of IAI Long Endurance UAV, by Misha Shepshelovich, dated 25-26 Feb. 2004. The Heron 1 tip slotted aerofoil is shown in FIG. 4 of this publication, having a maximum thickness to chord ratio of 17.5%, and having high lift characteristics (FIG. 3).

Figure 9:
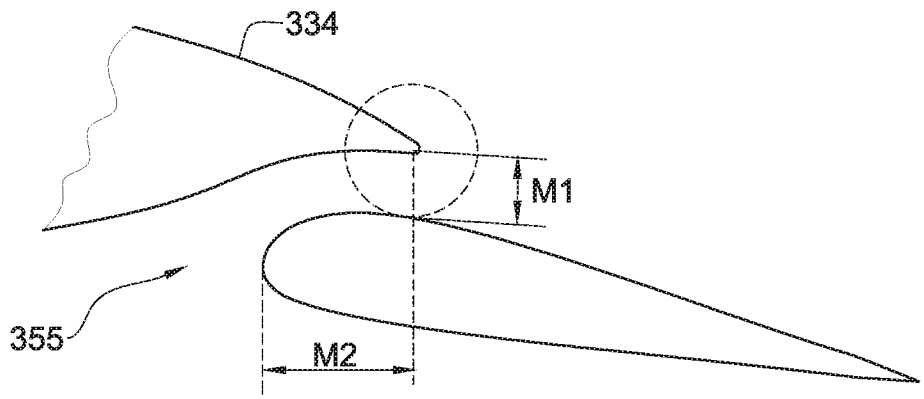
FIG. 9 schematically illustrates the gap size and longitudinal overlap between the primary element and the secondary element of the slotted aerofoil section of FIG. 3.

"Aerodynamics of Contaminated UAV Wings, by B. Marcus, M. Sarid and Misha Shepshelovich, dated 25-26 Feb. 2005. The Heron 1 tip slotted aerofoil is shown in FIG. 1 of this publication, having a maximum thickness to chord ratio of 17.5%, and having high lift characteristics (FIG. 9).

"Ice Accretion of Two-Element High-Lift UAV Wings", by Danny Abramov and Misha Shepshelovich, dated 6-7 Mar. 2013. The Heron 1 tip slotted aerofoil is shown in FIG. 4 of this publication, referred to as the SAT-41 aerofoil, and discussed in page 5 thereof, and having high lift characteristics (FIG. 7).

According to the three publications, the Heron 1 tip slotted aerofoil, provides endurance performance as well as lift characteristics, with a maximum coefficient of lift of between about 2.3 to 2.5, with zero flap deflection.

The SA aerofoil 300, has significant geometrical/aerodynamic differences with respect to the reference aerofoil profile DA, for example as follows.

Figure 7:
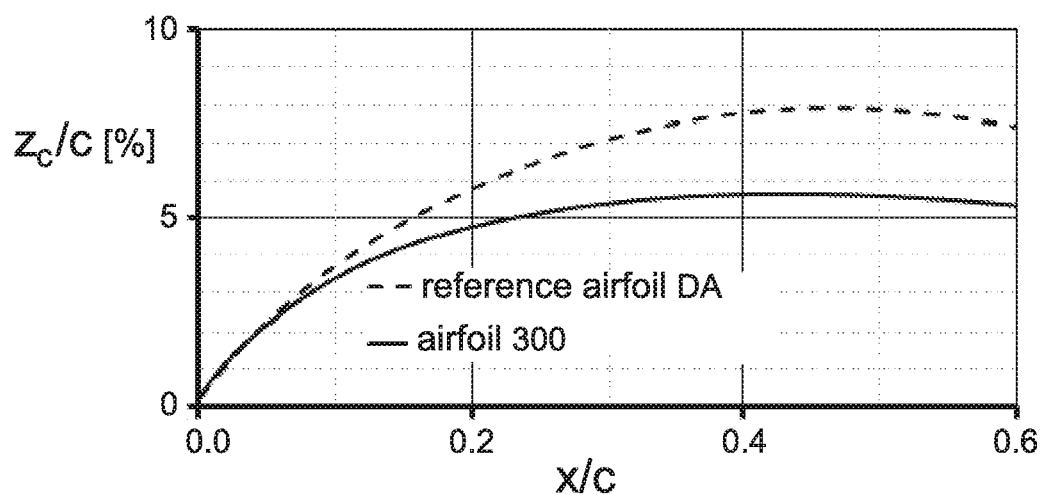
FIG. 7 schematically compares the camber distributions of airfoils of FIG. 5(a) and FIG. 5(b) along the respective chords.

Referring in particular to FIG. 3 and FIG. 7, the SA aerofoil 300 comprises a camber line CAM, that at least in this example peaks at about 6% of the chord C, and that at least in this example remains within 5% to 6% of the chord C between about 21% to about 60% of the chord C from the leading edge 338. This compares with a camber line for the reference aerofoil profile DA that peaks at about 8% of the respective chord, and that remains within 6% to 8% of the chord between about 21% to about 60% of the chord from the respective leading edge. In FIG. 7, the camber of the aerofoil 300 and of the datum aerofoil DA are defined a similar manner.

Figure 6:
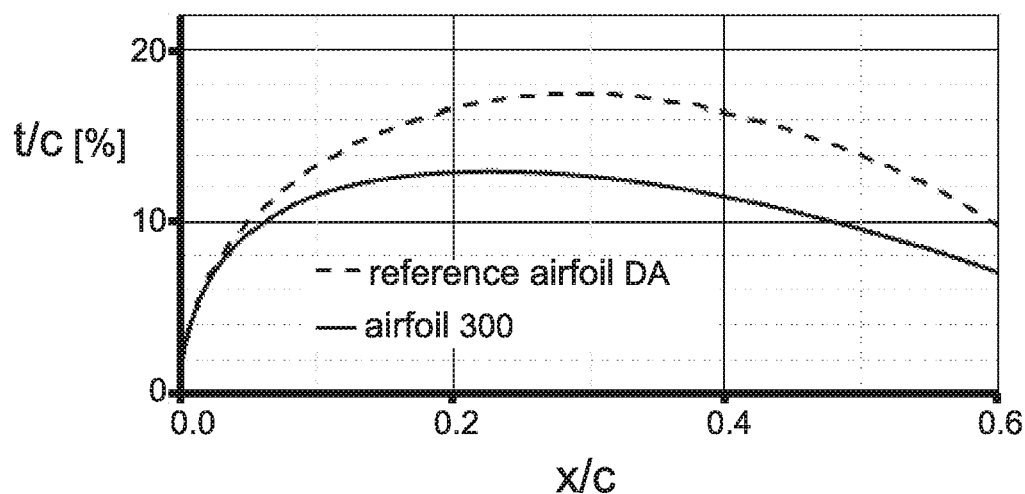
FIG. 6 schematically compares the thickness distributions of airfoils of FIG. 5(a) and FIG. 5(b) along the respective chords.

Referring in particular to FIG. 3 and FIG. 6, the SA aerofoil 300 comprises a thickness distribution, that at least in this example has a maximum thickness t of about 13% of the chord C, and that at least in this example remains within 10% to 13% of the chord C between about 5% to about 50% of the chord C from the leading edge 338. This compares with a thickness distribution for the reference aerofoil profile DA that has a maximum thickness t' of about 17.5% of the respective chord, and that remains within 10% to 17.5% of the chord between about 5% to about 50% of the chord from the leading edge.

Referring to FIG. 5(a) and FIG. 5(b), the maximum thickness t of the aerofoil 300 is reached at a chord position ct less than 25%, or example about 20%, of the chord C from the leading edge 338 of the aerofoil 300. In contrast, the maximum thickness t' of the datum aerofoil DA is reached at a chord position ct' of about 30% of the chord from the leading edge 338' thereof. Furthermore, the leading edge radius 305 of the aerofoil 300 is about 2% of the chord C from the leading edge 338 of the aerofoil 300. In contrast, the leading edge radius 305' of the datum aerofoil DA is about 2.3% of the chord from the leading edge 338' thereof.

Thus, since the maximum thickness t of the of the aerofoil 300 is more sharply reduced with respect to the maximum thickness t' of the of the datum aerofoil DA (17.5% to 13%), as compared to the relatively smaller decrease in respective leading edge radius (2.3% to 2%), the effective leading edge radius to maximum thickness of the aerofoil 300 is significantly larger than that of the datum aerofoil DA.

Furthermore, and referring again to FIG. 5(a) and FIG. 5(b), the spacing FS of the flap hinge point 359 from the secondary element 334 of the aerofoil 300 is significantly smaller than the spacing FS' of the flap hinge point 359' from the secondary element of the datum aerofoil DA.

Furthermore, and referring again to FIG. 5(a) and FIG. 5(b), the spacing BS of the pressure belly lowermost point 301 from the chord line CL of the aerofoil 300 is significantly smaller than the spacing BS' of the pressure belly 301' from the chord line CL' of the datum aerofoil DA. Furthermore, the spacing of the pressure belly lowermost point 301 from leading edge 338 of the aerofoil 300 is significantly smaller than the spacing of the pressure belly lowermost point 301' from the leading edge 338' of the datum aerofoil DA.

Figure 8:
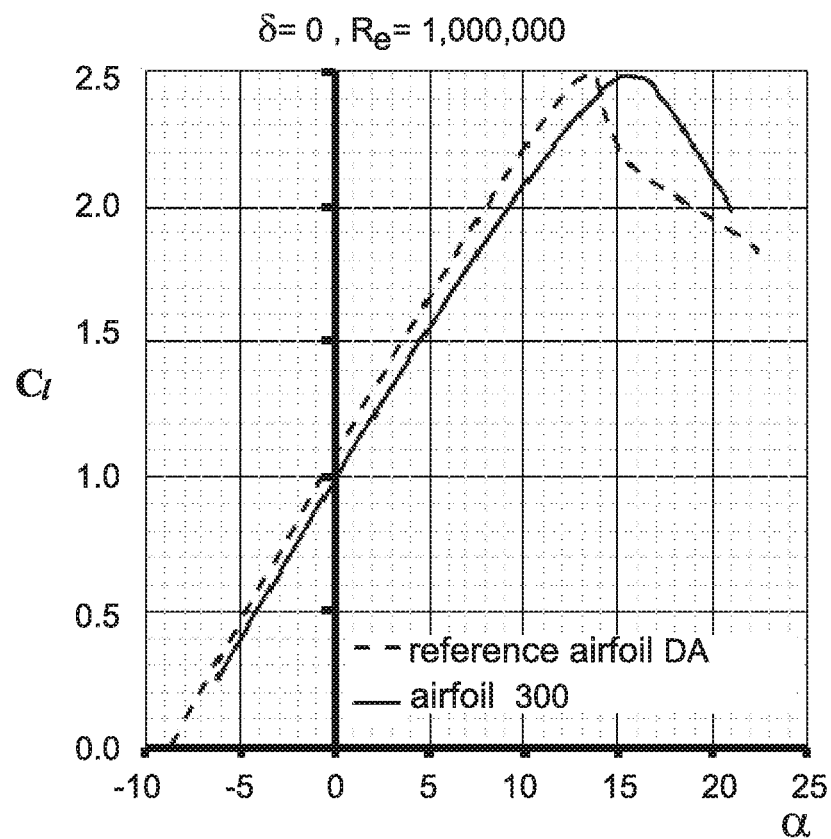
FIG. 8 schematically compares the lift coefficient distributions of airfoils of FIG. 5(a) and FIG. 5(b) with angle of attack, at zero flap angle and Reynold numbers of 1,000,000.
Figure 8A:
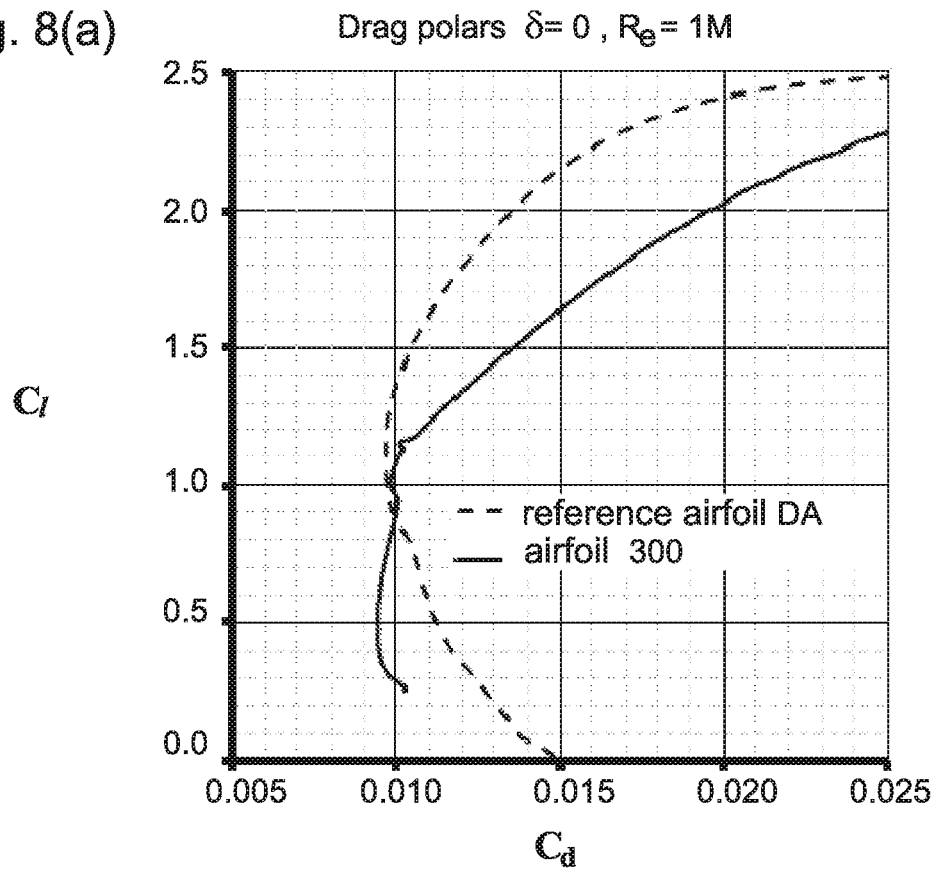
FIG. 8(a) schematically compares the lift coefficient distributions of airfoils of FIG. 5(a) and FIG. 5(b) with drag coefficient, at zero flap angle and Reynold numbers of 1,000,000.
Figure 8B:
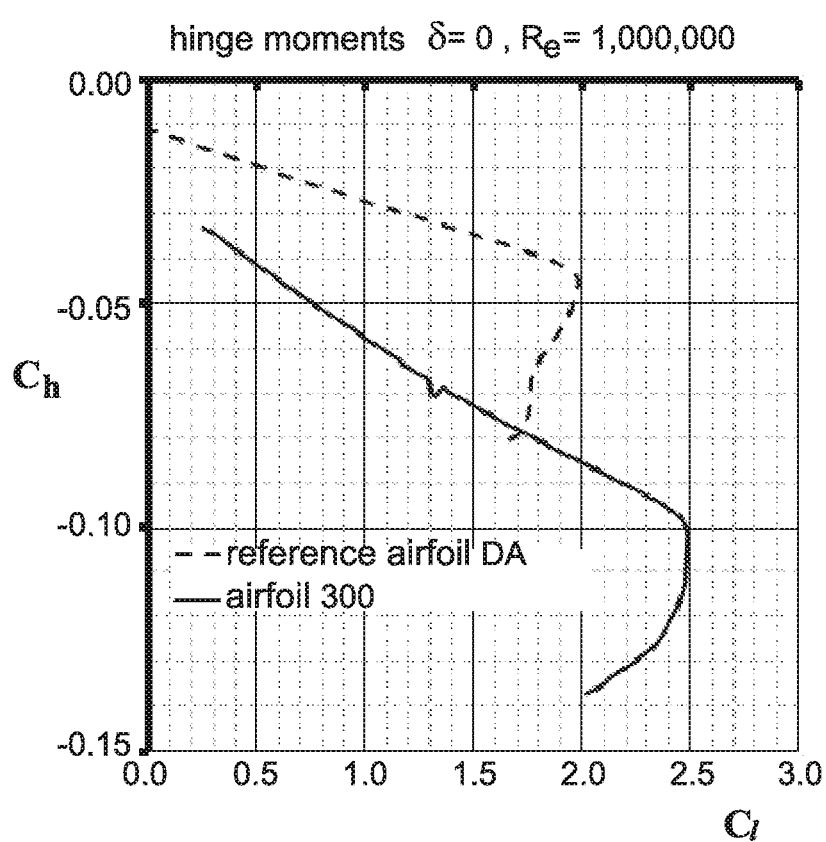
FIG. 8(b) schematically compares the hinge moment coefficient distributions for the secondary elements of airfoils of FIG. 5(a) and FIG. 5(b) with lift coefficient, at zero flap angle and Reynold numbers of 1,000,000.
Figure 8C:
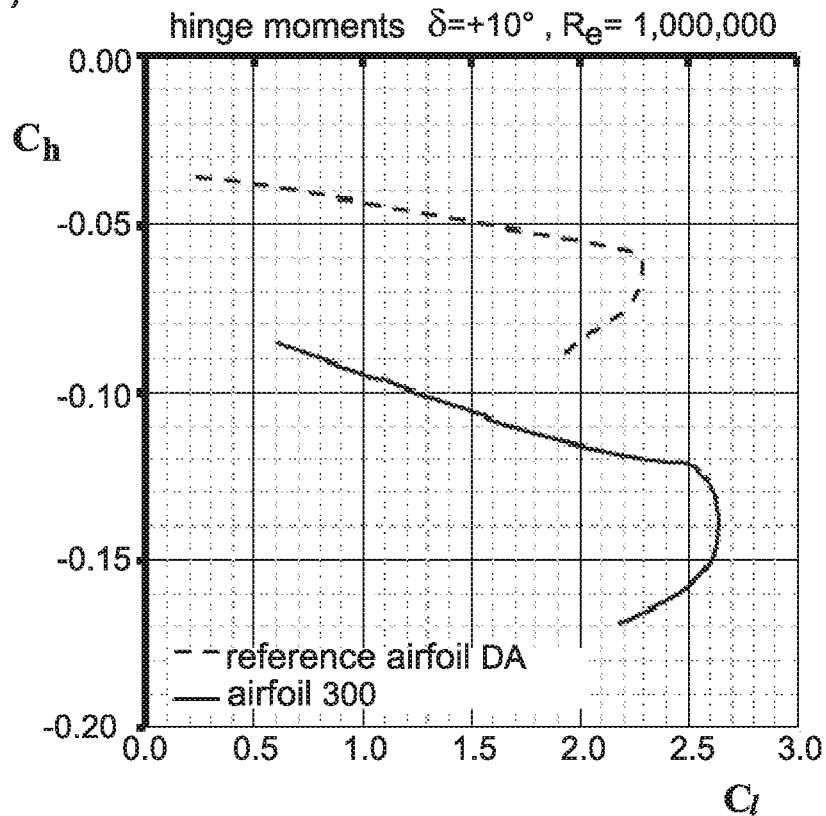
FIG. 8(c) schematically compares the hinge moment coefficient distributions for the secondary elements of airfoils of FIG. 5(a) and FIG. 5(b) with lift coefficient, at flap angle +10° and Reynold numbers of 1,000,000.

Referring also to FIG. 8, the SA aerofoil 300 exhibits a maximum coefficient of lift of about 2.5 at an angle of attack α of about 15° or 16°, and at least in this example the coefficient of lift is about 1.0 at angle of attack α of about 0°, and trails off to about 2.1 at angle of attack α of about 20°. This compares with a maximum coefficient of lift of about 2.5 for the reference aerofoil profile DA at an angle of attack α of about 13° or 14°, and the coefficient of lift is about 1.1 at angle of attack α of about 0°, and trails off to about 1.95 at angle of attack α of about 20°. On the other hand, and as can be seen in FIGS. 8(a), 8(b), and 8(c), the SA aerofoil 300 exhibits greater drag and greater actuator loads, as compared with the reference aerofoil profile DA.

Figure 10A:
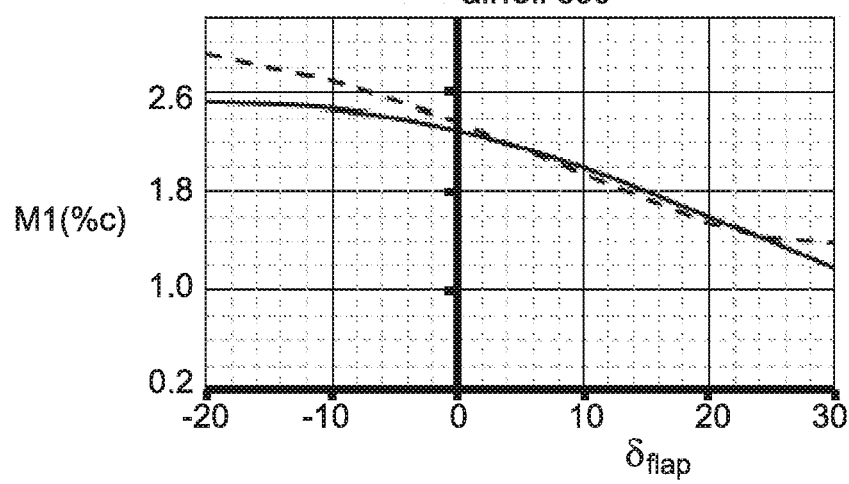
FIG. 10(a) schematically compares the gap size distributions of airfoils of FIG. 5(a) and FIG. 5(b) with flap deflection angle.
Figure 10B:
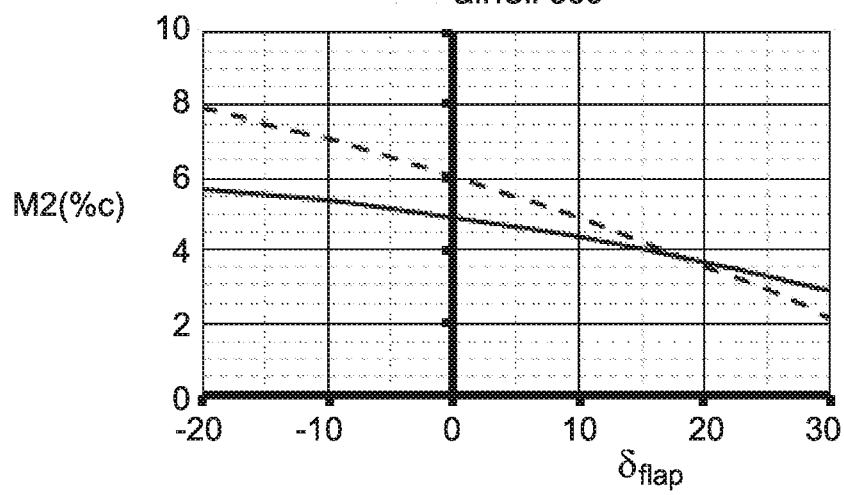
FIG. 10(b) schematically compares the longitudinal overlap distributions of airfoils of FIG. 5(a) and FIG. 5(b) with flap deflection angle.

Referring to FIG. 9 and FIG. 10(a), the secondary element 334 is spatially positioned with respect to the primary element 332 to provide a characteristic relationship between the gap size M1 of gap 355 (between primary element 332 and the secondary element 334), and the deflection angle δ of the secondary element 334 with respect to the primary element 332. This relationship is illustrated in FIG. 10(*a*), and shows that the gap size M1 of gap 355 is at a maximum of about 2.5% of the chord C at a deflection angle δ of −20°, and this gap size M1 reduces to about 2.3% at of the chord C at a deflection angle δ of 0°, and continues to reduce to about 1.2% of the chord C at a deflection angle δ of 30°. This compares with a maximum gap size of about 2.9% of the chord for the reference aerofoil profile DA at a deflection angle δ of −20°, and this gap size reduces to about 2.4% at of the chord at a deflection angle δ of 0°, and continues to reduce to about 1.4% of the chord at a deflection angle δ of 30°.

Referring to FIGS. 9 and 10(*b*), the secondary element 334 is spatially positioned with respect to the primary element 332 to provide a characteristic relationship between the longitudinal overlap M2 (between primary element 332 and the secondary element 334), and the deflection angle δ of the secondary element 334 with respect to the primary element 332. This relationship is illustrated in FIG. 10(*b*), and shows that the longitudinal overlap M2 is at a maximum of about 5.7% of the chord C at a deflection angle δ of −20°, and this longitudinal overlap M2 reduces to about 5% at of the chord C at a deflection angle δ of 0°, and continues to reduce to about 3% of the chord C at a deflection angle δ of 30°. This compares with a maximum longitudinal overlap of about 8% of the chord for the reference aerofoil profile DA at a deflection angle δ of −20°, and this longitudinal overlap reduces to about 6% at of the chord at a deflection angle δ of 0°, and continues to reduce to about 2% of the chord at a deflection angle δ of 30°.

It is considered that the aerofoil 300 can have certain characteristics relative to the aforesaid reference aerofoil profile DA, including for example the following:

Reduced maximum thickness, and at relative forward position, which together can reduce the maximum absolute thickness, and/or increase maximum lift.

Reduced maximum camber, which can reduce maximum absolute thickness and can decrease the maximum lift.

Relatively (to the max. thickness) large leading edge radius to maximum thickness ratio, which can increase the maximum lift.

Hinge location nearer the lower flap surface, which can reduce the minimum value for maximum absolute thickness.

More forward and less pronounced pressure "belly" on the pressure surface of the aerofoil, which can reduce the minimum value for maximum absolute thickness, and can slightly increase maximum lift.

As mentioned above, the wing system 200 has a stowed configuration SC, a pre-deployed configuration PC and a deployed configuration DC.

Figure 11A:
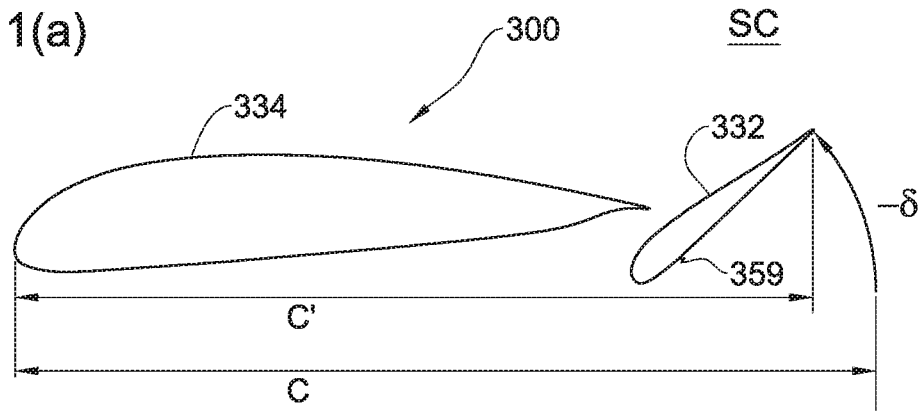
FIG. 11(a) illustrates the slotted aerofoil section of FIG. 3 in stowed configuration.
Figure 11B:
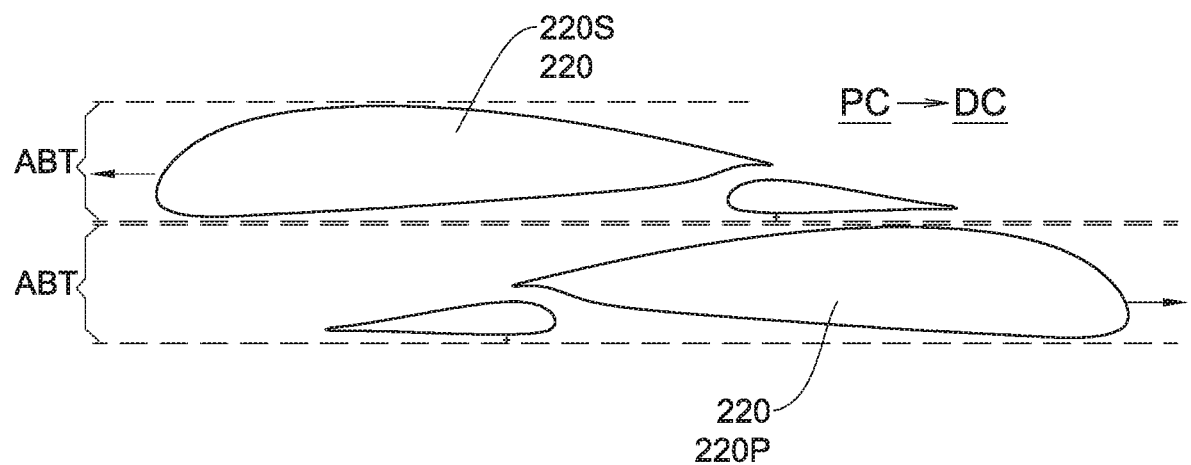
FIG. 11(b) illustrates the slotted aerofoil section of FIG. 3 in pre-deployed configuration.
Figure 11C:
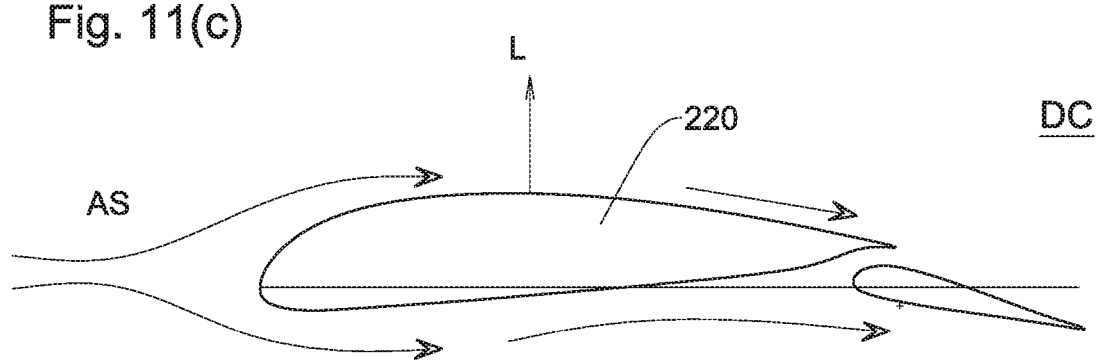
FIG. 11(c) illustrates the slotted aerofoil section of FIG. 3 in deployed configuration.
Figure 12A:
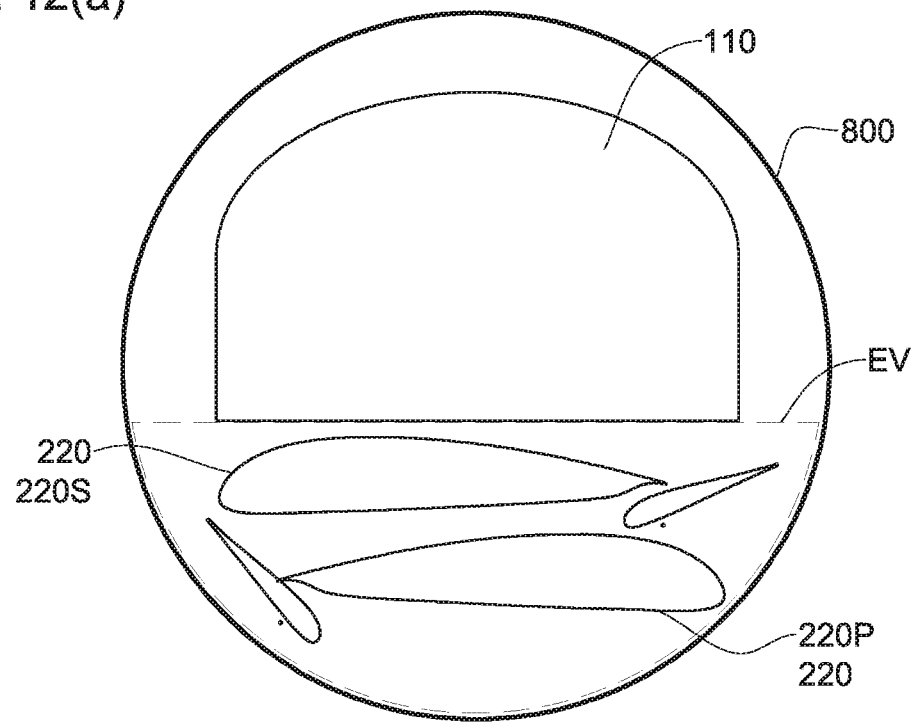
FIG. 12(a) is a transverse cross-sectional view of an air vehicle of FIG. 1, showing the envelope therein.
Figure 12B:
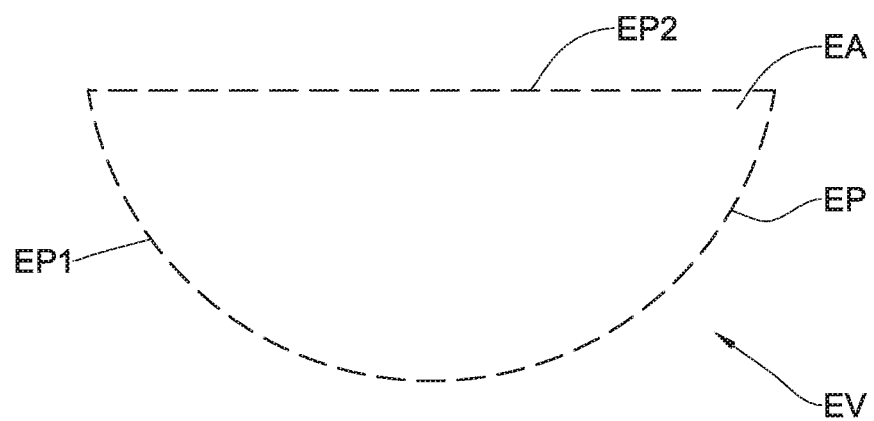
FIG. 12(b) shows a cross-sectional envelope of FIG. 12(a).

Referring to FIG. 1, FIG. 11(*a*), FIG. 12(*a*) and FIG. 12(*b*), in the stowed configuration SC the two wings 220P, 200S are in a first general superposed spatial relationship with respect to one another and are capable of being accommodated within an envelope EV having an envelope cross-sectional profile EP and a corresponding envelope cross-sectional area EA. In this configuration, the leading edge of one wing 220 is generally superposed over the trailing edge of the other wing 220.

Such an envelope EV is defined, in at least this example, by the space available in the fairing 800 for the wing system 200, once the cross-section of the fuselage 110 has been accounted for. In at least this example, in which the fairing 800 has a circular cross-sectional area, the envelope EV is defined as a sector of a circle having a diameter D equal to the internal diameter of the fairing 800.

Thus, the envelope cross-sectional profile EP includes an arc portion EP1 and a chord portion EP2, and the envelope cross-sectional area EA is given by the area enclosed in the cross-sectional profile EP, between the arc portion EP1 and the chord portion EP2.

According to an aspect of the presently disclosed subject matter, each aerofoil profile 300 of the two wings 220P, 220S is configured with a minimum respective said absolute thickness ABT and a maximum chord C such that in said stowed configuration SC the respective aerofoil profiles 300 of the two wings 220 in the respective general superposed spatial relationship are capable of being accommodated within the envelope cross-sectional profile EP while concurrently maximizing occupancy of the envelope cross-sectional area EA. In other words, according to an aspect of the presently disclosed subject matter, each aerofoil profile 300 of the two wings 220P, 220S is configured for maximizing occupancy of the envelope cross-sectional area EA, while taking account of the shape of the envelope cross-sectional profile EP in which the two superposed aerofoils 300 are required to fit into, and while providing high lift characteristics. In general, the lower the maximum thickness t, the larger the chord C that can be provided, within limits.

In at least this example, this is achieved by designing the two superposed aerofoil sections 300 with a profile having a minimum value for maximum absolute thickness ABT, and concurrently with a maximum value for the chord C, such that allows the two aerofoils 300 of the two wings 220P, 220S in the aforesaid first general superposed spatial relationship to be accommodated within the envelope cross-sectional profile EP. This is enhanced by providing reduced maximum thickness, reduced camber, and increased leading edge radius to thickness ratio, as compared with designing an aerofoil of the same chord and general high lift characteristics, but that is not required to fit within the envelope EV.

In at least this example, the aerofoil profiles 300 of the two wings 220 have an aggregate cross-sectional area corresponding to an occupancy of between 40% and 30% of said envelope cross-sectional area. In other words, the aerofoil profiles 300 of the two wings 220 have an aggregate cross-sectional area of between 40% and 30% of said envelope cross-sectional area EA.

Referring in particular to FIG. 11(*a*) it is to be noted that a feature of the slotted two-element airfoil nature of aerofoil 300 is that the pivotability of the secondary element 334 allows the secondary element 334 to be pivoted to a large negative deflection angle δ, and thereby effectively reduces the magnitude of the chord C to a smaller effective chord C' in the stowed configuration SC. For example, in the example of aerofoil 300 of FIG. 3, chord C is reduced by 13% to provide reduced chord C' at a negative deflection angle δ for the secondary element 334 of about −72°. Furthermore, pivoting the secondary element 334 to such a large negative deflection angle δ also allows more usage of the space available in the curved part of the arch portion EP1, as best seen in FIG. 12(*a*) in particular for the aerofoil 300 of the lower port wing 220P.

It is also to be noted that another feature of the slotted two-element airfoil nature of aerofoil 300 is that the pivotability of the secondary element 334 also allows the secondary element 334 of each of the two superposed wings 220S, 220P to be pivoted to two negative deflection angles δ, different from one another, or for the secondary element 334 of each of the two superposed wings 220S, 220P to be pivoted to two positive deflection angles δ, different from one another.

For example, in the example illustrated in FIG. 1, in which the wing system 200 is mounted to an underside of the fuselage 110, the upper wing 220 (for example the starboard wing 220S) can have a deflection angle δ1 in a range −25° to −35°, for example about −30°, for example −32°, while the lower wing 220 (for example the port wing 220P) can have a deflection angle δ2 in a range −55° to −65°, for example about −60°. This versatility in deflection angles for the wings 220, and in particular for enabling providing different negative deflection angles δ for the two wings 220 in the stowed configuration SC allows designing the aerofoil 300 with a larger chord C than would otherwise be the case (for example also larger than would be possible with a single element aerofoil). Furthermore, the aforesaid versatility, together with the reduced camber, reduced thickness, and reduced absolute maximum thickness, also allows for maximizing usage of the envelope EV, and minimizing the size of such an envelope EV as compared for example with the datum aerofoil 300. In this example, in which the wings 220 are below the fuselage 110, the room available for the lower wing 220 (in a direction parallel to the chord line CL) is less than the room available for the upper wing 220, in view of the curvature of the arc portion EP1. However, rather than having the chord limited by the room available to the lower wing, which would be the case for a single element wing, the presently disclosed subject matter allows for a pair of a two-element aerofoil 300 of relatively larger chord to be fitted, in "nose to tail" arrangement, in which there can be significant overlap between parts of the two wings in a direction parallel to the pivot axes PA. Such overlap is removed when the wing system 200 is transitioned to the pre-deployed configuration PC. By "nose to tail" arrangement is meant that the leading edge of each wing 220 (or corresponding aerofoils 300) is in close proximity to the trailing edge of the other wing 220 (or corresponding aerofoils 300).

Figure 13:
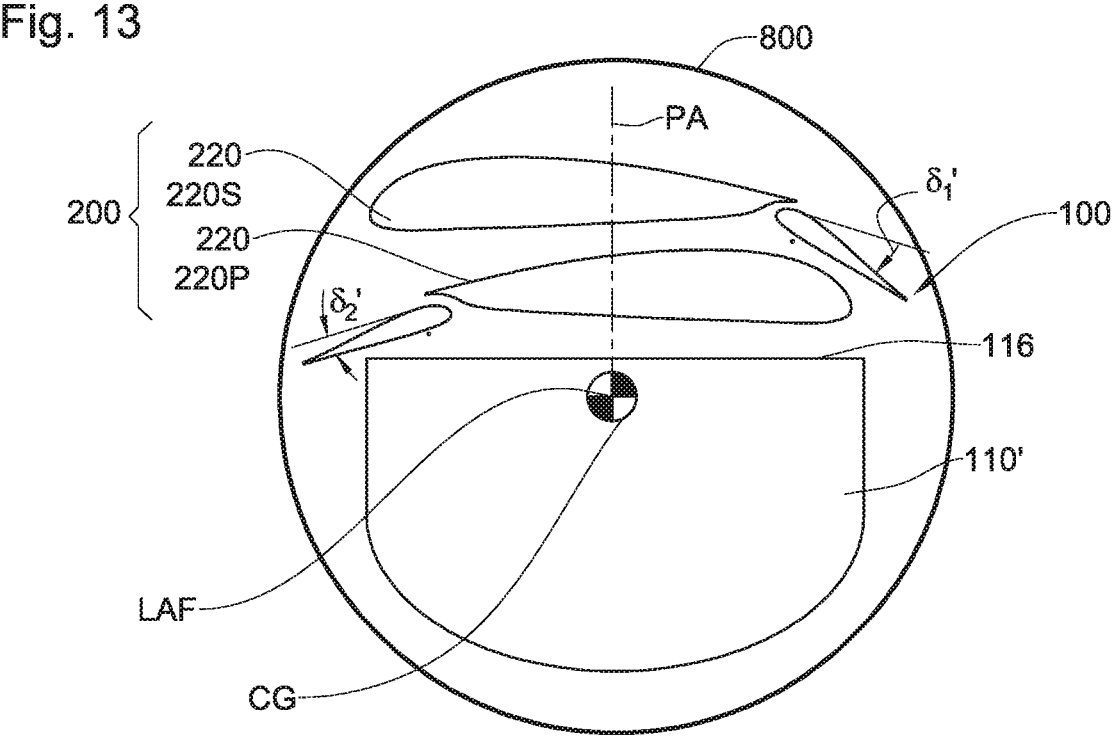
FIG. 13 is a transverse cross-sectional view of an air vehicle according to a variation of the example of FIG. 1, in the stowed configuration accommodated in a fairing.

Also for example, in the example illustrated in FIG. 13, in which the wing system 200 is mounted to an upper side of the fuselage 110, the upper wing 220 (for example the starboard wing 220S) can have a positive deflection angle δ1' in a range +15° to +25°, for example of about +20°, while the lower wing 220 (for example the port wing 220P) can have a deflection angle δ2' in a range +1° to +10°, for example about +5°. This versatility in deflection angles for the wings 220, and in particular for enabling providing different positive deflection angles δ for the two wings 220 in the stowed configuration SC allows designing the aerofoil 300 with a larger chord C than would otherwise be the case (for example also larger than would be possible with a single element aerofoil). Furthermore, the aforesaid versatility, together with the reduced camber, reduced thickness, and reduced absolute maximum thickness, also allows for maximizing usage of the envelope EV, and minimizing the size of such an envelope EV as compared for example with the datum aerofoil 300. In this example, in which the wings 220 are above the fuselage 110, the room available for the lower wing 220 (in a direction parallel to the chord line CL) is greater than the room available for the upper wing 220, in view of the curvature of the arc portion of the respective envelope. However, rather than having the chord limited by the room available to the upper wing, which would be the case for a single element wing, the presently disclosed subject matter allows for a pair of a two-element aerofoil 300 of relatively larger chord to be fitted, in "nose to tail" arrangement, in which there can be significant overlap between parts of the two wings in a direction parallel to the pivot axes PA. Such overlap is removed when the wing system 200 is transitioned to the pre-deployed configuration PC.

It is also to be noted that in the stowed configuration SC, it is possible to deflect the respective secondary elements 334 of the two wings to the maximum possible of the respective mechanical ranges, if necessary, to maximize the usage of the envelope. For example, a respective ratio of the chord C to internal diameter D of the fairing 800 is in any one of the following ranges: 70% to 90%; 70% to 87%; 75% to 85%.

For example, a respective ratio of the maximum thickness t to internal diameter D of the fairing 800 is in any one of the following ranges: 7% to 12%; 8% to 11%; 9% to 10%.

For example, a respective ratio of the minimum value of maximum absolute thickness ABT to internal diameter D of the fairing 800 is in any one of the following ranges: 7% to 12%; 8% to 14%; 7% to 14%.

Referring in particular to FIG. 1(a), FIG. 4 and FIG. 11(b), in the pre-deployed configuration PC the two wings 220P, 200S are in second general superposed spatial relationship with respect to one another and capable of deploying to the deployed configuration DC. In this configuration, the leading edge of one wing 220 is generally superposed over the trailing edge of the other wing 220.

In this configuration, the two superposed aerofoils 300 have their respective secondary elements 334 pivoted, from the respective deflection angle δ corresponding to the stowed configuration SC, to a particular negative deflection angle δ such that each aerofoil 300 presents a transverse height equal to the minimum value of the maximum absolute thickness ABT. In this and other examples, deflection angle δ for the two wings is identical, for example −10° to −15°.

It is to be noted that at least in this example, and in other examples, in the stowed configuration SC the value of the maximum absolute thickness is greater than the minimum value of the maximum absolute thickness ABT. Thus, concurrent with transitioning the aerofoils 300 from the stowed configuration SC to the pre-deployed configuration PC, the two superposed aerofoils 300 have their respective secondary elements 334 pivoted such as to reduce the maximum absolute thickness at the stowed configuration SC to the minimum value of the maximum absolute thickness ABT required for the pre-deployed configuration PC.

To maximize usage of the envelope EV the two aerofoils 300 are stacked at the pivot axis PA as close to one another as possible, in which the corresponding first imaginary line IM1 of the lower aerofoil 300 (i.e., of the port wing 220P) is at, or spaced close to, the second imaginary line IM2 of the upper aerofoil 300 (i.e., of the starboard wing 220S). For example, in the pre-deployed configuration PC, the deflection angle δ can be set at an angle in the range between −10° to −15°.

Transitioning of the wing system 200 from the stowed configuration SC to the pre-deployed configuration PC can occur responsive to separating the air vehicle 100 from the fairing 800. Such separation can occur while the air vehicle 100 is already airborne and travelling at a significant forward speed, for example. Once the fairing 800 is removed, in the example of FIG. 1, the secondary elements 334 can be pivoted from the large negative deflection angle δ corresponding to the stowed configuration SC, to a smaller negative deflection angle δ corresponding to the pre-deployed configuration PC, to thereby enable the respective aerofoils 300 to minimize their respective transverse heights to each equal the maximum absolute thickness ABT. Similarly, once the fairing 800 is removed in the example of FIG. 13, the secondary elements 334 can be pivoted from the respective positive deflection angles δ corresponding to the stowed configuration SC, to the required negative deflection angle δ corresponding to the pre-deployed configuration PC, to thereby enable the respective aerofoils 300 to minimize their respective transverse heights to each equal the maximum absolute thickness ABT.

In each of the two examples, this results in the two stacked wings 220P, 220S, being capable of pivoting about their pivot axes PA from the pre-deployed configuration PC to the deployed configuration DP without colliding or otherwise interfering with one another.

It is to be noted that the maximum absolute thickness to chord ratio of each wing 220 is such as to enable the wings 220 to deploy from the pre-deployed configuration PC to the deployed configuration DC without interference therebetween.

FIG. 11(b) schematically illustrates an intermediate position as the wings 220 are transitioning from the pre-deployed configuration PC to the deployed configuration DC.

Referring in particular to FIG. 2 and FIG. 11(b), in the deployed configuration DC the wings 220 are now fully deployed, such that the leading edge of the wings are now facing an airstream AS. Such an airstream relative to the wings 220 can be a result of the air vehicle 100 travelling at a significant forward speed in air. For example, the wings 220 are pivoted about their respective axes by about 90° from the pre-deployed configuration PC, in which the spans of the wings 220 are substantially parallel to the longitudinal axis of the air vehicle 100. In the deployed configuration DC, each wing 220 is capable of generating aerodynamic lift L in the airstream AS, and this enables the air vehicle 100 to be flown in aerodynamic flight mode. In particular, the high lift characteristics of the aerofoils 300 provide high lift performance to the air vehicle 100. For example, in the deployed configuration DC, the spans of the wings 220 are substantially non-parallel to the longitudinal axis of the air vehicle 100, for example at 90° to the longitudinal axis of the air vehicle 100 for examples in which the wings 220 are zero-swept wings, or less than 90° for examples in which the wings 220 are swept wings.

It is to be noted that at the commencement of the deployed configuration DC, and thus at the end of transitioning from the pre-deployed configuration PC to the deployed configuration DC, the respective secondary elements 334 of the two wings 220 deployed configuration DC, are at a relative large negative deflection angles δ, for example −10° to −15°. Referring to FIG. 14, this corresponds to a lower coefficient of lift than at deflection angles δ of zero, for example, that correspond to cruise conditions. This feature results in relatively low wing loading, as a result of less lift being generated by the wings 220, as the wings are being suddenly exposed to the air stream, as compared with providing the wings 220 immediately at the beginning of the deployed configuration DC with the required deflection angle δ of, say, zero. This feature, which is inherent according to an aspect of the presently disclosed subject matter, can enable the wings to be designed lighter than otherwise, since less impact loads can be expected on deployment. Furthermore, this feature can also be taken into account in the design process to design the aerofoil 300 already with a larger negative deflection angles δ at the pre-deployed configuration to further reduce initial impact loads at the deployed configuration DC. Thus, in at least this example, the secondary elements 334 can be maintained with large negative deflection angles δ, for example −10° to −15°, until full deployment at the deployed configuration DC, and after initial impact loads from the airstream, the secondary elements 334 can be pivoted to zero or positive deflection angles δ, according to the lift or performance requirements of the mission, for example cruise or loiter.

It is to be noted that in alternative variations of this example, and in other examples, the fairing can have an internal geometry different from that of a segment of a circle. For example, the corresponding cross-sectional profile EP can be for example polygonal (for example rectangular, square, hexagonal and so on), or part of an ellipse, or part of a super-ellipse. In a similar manner to the illustrated example, mutatis mutandis, each aerofoil profile 300 of the two wings 220P, 220S is similarly configured for maximizing occupancy of the respective envelope cross-sectional area of the envelope, while taking account of the shape of the envelope cross-sectional profile of the envelope in which the two superposed aerofoils 300 are required to fit into.

It is also to be noted that in yet other alternative variations of this example, and in other examples, the fairing can be omitted, and instead the respective envelope refers instead to a corresponding cross-sectional profile EP relating to a container in which the air vehicle 100 can be stored for transport or for safety, until required to be used. In such a container, the air vehicle 100 is accommodated in the respective stowed configuration, and once removed from the container, can be transitioned to the respective pre-deployed configuration, for example by ground crews.

It is further to be noted that in at least one example of the presently disclosed subject matter, in the stowed configuration the corresponding cross-sectional profile EP can be limited due to a variety of factors, for example required fuselage cross-section, and the presently disclosed subject matter enables providing two-element aerofoil wings that enable maximizing usage of this limited space.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A wing system for an air vehicle, the wing system having a stowed configuration, a pre-deployed configuration and a deployed configuration, the wing system comprising:
   two wings, each said wing having aerofoil profiles and being pivotably deployable about a respective pivot axis between the pre-deployed configuration and the deployed configuration, wherein:
   in the stowed configuration the two wings are in first general superposed spatial relationship with respect to one another and are capable of being accommodated within an envelope having an envelope cross-sectional profile and a corresponding envelope cross-sectional area;
   in the pre-deployed configuration the two wings are in second general superposed spatial relationship with respect to one another and capable of deploying to the deployed configuration without interfering with one another; and in the deployed configuration the wings are each capable of generating aerodynamic lift in an airstream;

each said aerofoil profile of each wing being a slotted aerofoil having a primary element, a secondary element and a chord, the secondary element being pivotable with respect to the primary element and spaced therefrom by a gap, each said aerofoil profile having a respective maximum thickness, and a respective maximum absolute thickness;

wherein in said stowed configuration, the respective second element of each said aerofoil of one said wing is set at a different flap angle as compared with the respective second element of each said aerofoil of the other said wing.

2. The wing system according to claim 1, including one of the following:

wherein said two wings comprise a first said wing having a first said aerofoil profile, the first aerofoil profile comprising a first leading edge and a first trailing edge, and a said second wing having a second said aerofoil profile, the second aerofoil profile comprising a second leading edge and a second trailing edge; or wherein said two wings comprise a first said wing having a first said aerofoil profile, the first aerofoil profile comprising a first leading edge and a first trailing edge, and a said second wing having a second said aerofoil profile, the second aerofoil profile comprising a second leading edge and a second trailing edge, and, wherein in said pre-deployed configuration, said first leading edge is generally superposed over said second trailing edge.

3. The wing system according to claim 1, wherein a respective maximum absolute thickness to chord ratio of each said wing is such as to enable the wings to deploy from the pre-deployed configuration to the deployed configuration without interference therebetween.

4. The wing system according to claim 1, including one of the following:

wherein the respective second element of each said aerofoil profile of each said wing has a hinge axis for enabling pivoting of the respective second element with respect to the respective primary element;

wherein the respective second element of each said aerofoil profile of each said wing has a hinge axis for enabling pivoting of the respective second element with respect to the respective primary element, and, wherein said hinge axis is facing a pressure surface of the respective secondary element;

wherein the respective second element of each said aerofoil profile of each said wing has a hinge axis for enabling pivoting of the respective second element with respect to the respective primary element, and, wherein for each said aerofoil profile, the respective hinge axis is spaced from the pressure surface of the respective secondary element by a spacing;

wherein the respective second element of each said aerofoil profile of each said wing has a hinge axis for enabling pivoting of the respective second element with respect to the respective primary element, and, wherein said hinge axis is facing a pressure surface of the respective secondary element, and, wherein for each said aerofoil profile, the respective hinge axis is spaced from the pressure surface of the respective secondary element by a spacing;

wherein the respective second element of each said aerofoil profile of each said wing has a hinge axis for enabling pivoting of the respective second element with respect to the respective primary element, and, wherein for each said aerofoil profile, the respective hinge axis is spaced from the pressure surface of the respective secondary element by a spacing, and, wherein said spacing is less than 50% of a maximum thickness of the secondary element; or wherein the respective second element of each said aerofoil profile of each said wing has a hinge axis for enabling pivoting of the respective second element with respect to the respective primary element, and, wherein said hinge axis is facing a pressure surface of the respective secondary element, and, wherein for each said aerofoil profile, the respective hinge axis is spaced from the pressure surface of the respective secondary element by a spacing, and, wherein said spacing is less than 50% of a maximum thickness of the secondary element.

5. The wing system according to claim 4, wherein in said stowed configuration, the respective second element of each said aerofoil profile of each said wing is set at a respective second flap angle such that the respective said trailing edge and the respective hinge axis of the respective second element are on opposite sides of the respective chord line of the aerofoil profile.

6. The wing system according to claim 1, including one of the following:

wherein in said pre-deployed configuration, the respective second element of each said aerofoil profile of each said wing is set at a respective negative flap angle;

wherein in said pre-deployed configuration, the respective second element of each said aerofoil profile of each said wing is set at a respective negative flap angle, and, wherein in said pre-deployed configuration, the respective second element of each said aerofoil profile of each said wing is set at an identical flap angle; or wherein in said pre-deployed configuration, the respective second element of each said aerofoil profile of each said wing is set at a respective negative flap angle, and, wherein in said pre-deployed configuration, the respective second element of each said aerofoil profile of each said wing is set at a respective first flap angle such that no part of the respective second flap intersects an imaginary line that is tangential to the respective aerofoil leading edge and that intersects the respective hinge axis.

7. The wing system according to claim 1, wherein each said aerofoil profile is configured with a minimum respective said absolute thickness and a maximum said chord such that in said stowed configuration the respective said aerofoil profiles of said two wings in said first general superposed spatial relationship are capable of being accommodated within said envelope cross-sectional profile while concurrently maximizing occupancy of said envelope cross-sectional area.

8. The wing system according to claim 1 wherein the wing system is configured for being mounted to an underside of a fuselage of the air vehicle.

9. The wing system according to claim 1, including one of the following:

wherein the wing system is configured for being mounted to an upper side of a fuselage of the air vehicle;

wherein the wing system is configured for being mounted to an upper side of a fuselage of the air vehicle, and, wherein in said stowed configuration, the respective second element of each said aerofoil profile of each said wing is set at a respective positive flap angle;

wherein the wing system is configured for being mounted to an upper side of a fuselage of the air vehicle, and, wherein in said stowed configuration, the respective second element of each said aerofoil profile of an uppermost said wing is set at a respective positive flap angle in a range +15° to +25°, and wherein the respective second element of each said aerofoil profile of a lowermost said wing is set at a respective positive flap angle in a range +1° to +10°; or wherein the wing system is configured for being mounted to an upper side of a fuselage of the air vehicle, and, wherein in said stowed configuration, the respective second element of each said aerofoil profile of each said wing is set at a respective positive flap angle, and, wherein in said stowed configuration, the respective second element of each said aerofoil profile of an uppermost said wing is set at a respective positive flap angle in a range +150 to +25°, and wherein the respective second element of each said aerofoil profile of a lowermost said wing is set at a respective positive flap angle in a range +1° to +10°.

10. The wing system according to claim 1, including one of the following:

wherein for each said aerofoil profile, the respective said maximum thickness to chord ratio is in the range 0.10 to 0.14; or wherein for each said aerofoil profile, the respective said maximum absolute thickness to chord ratio is in the range 0.10 to 0.15.

11. The wing system according to claim 1, wherein each said aerofoil profile has a respective said maximum thickness at a position less than 25% of the chord from the leading edge of the aerofoil profile.

12. The wing system according to claim 1, wherein each said aerofoil profile has a camber profile with a maximum camber of about 6% or less of the chord.

13. The wing system according to claim 1, wherein for each said aerofoil profile, the respective leading edge radius is about 2% of the chord.

14. The wing system according to claim 1, wherein for each said aerofoil profile, the respective said primary element has a primary element trailing edge, and wherein the respective said secondary element has a secondary element leading edge including one of the following:

wherein the primary element trailing edge overlaps the secondary element leading edge by a longitudinal overlap in a direction parallel to the chord;

wherein the primary element trailing edge overlaps the secondary element leading edge by a longitudinal overlap in a direction parallel to the chord, and, the respective said longitudinal overlap varies between about 5% to about 3% of the chord, as the respective said flap angle increases from 0° to 30°; or wherein the primary element trailing edge overlaps the secondary element leading edge by a longitudinal overlap in a direction parallel to the chord, and, wherein for each said aerofoil profile, the respective said longitudinal overlap varies between about 5% to about 5.5% of the chord, as the respective said flap angle decreases from 0° to −20°.

15. The wing system according to claim 1, including one of the following:

wherein each said aerofoil profile is configured as a high lift aerofoil profile;

wherein each said aerofoil profile is configured as a high lift aerofoil profile, and, wherein said aerofoil profile is configured as having a maximum lift coefficient of at least 2.5 at zero flap angle;

wherein each said aerofoil profile is configured as a high lift aerofoil profile, and, wherein said aerofoil profile is configured as having a maximum lift coefficient of greater than 2.3 at zero flap angle;

wherein each said aerofoil profile is configured as a high lift aerofoil profile, and, wherein said aerofoil profile is configured as having a maximum lift coefficient of at least 2.5 at zero flap angle, and, wherein said maximum lift coefficient corresponds to an angle of attack of between about 150 and about 16°; or wherein each said aerofoil profile is configured as a high lift aerofoil profile, and, wherein said aerofoil profile is configured as having a maximum lift coefficient of greater than 2.3 at zero flap angle, and, wherein said maximum lift coefficient corresponds to an angle of attack of between about 150 and about 16°.

16. The wing system according to claim 1, wherein said aerofoil profiles of said two wings have an aggregate cross-sectional area corresponding to a said occupancy of between 40% to 30% of said envelope cross-sectional area.

17. The wing system according to claim 1, including one of the following:

wherein said envelope cross-sectional profile is in the form of a segment of a circle of predetermined diameter, the segment being defined by a corresponding arc portion and a corresponding chord portion;

wherein said envelope cross-sectional profile is in the form of a segment of a circle of predetermined diameter, the segment being defined by a corresponding arc portion and a corresponding chord portion, and, wherein for each said aerofoil profile, a respective first ratio of said chord to said diameter is in the range 70% to 87%;

wherein said envelope cross-sectional profile is in the form of a segment of a circle of predetermined diameter, the segment being defined by a corresponding arc portion and a corresponding chord portion, and, wherein for each said aerofoil profile, a respective first ratio of said chord to said diameter is in the range 70% to 87%;

wherein said envelope cross-sectional profile is in the form of a segment of a circle of predetermined diameter, the segment being defined by a corresponding arc portion and a corresponding chord portion, and, including at least one of the following: wherein for each said aerofoil profile, a respective second ratio of said maximum thickness to said diameter is in the range 7% to 12%; wherein for each said aerofoil profile, a respective second ratio of said maximum absolute thickness to said diameter is in the range 8% to 14%;

wherein said envelope cross-sectional profile is in the form of a segment of a circle of predetermined diameter, the segment being defined by a corresponding arc portion and a corresponding chord portion, and, wherein for each said aerofoil profile, a respective first ratio of said chord to said diameter is in the range 70% to 87%, and, including at least one of the following: wherein for each said aerofoil profile, a respective second ratio of said maximum thickness to said diameter is in the range 7% to 12%; wherein for each said aerofoil profile, a respective second ratio of said maximum absolute thickness to said diameter is in the range 8% to 14%; or wherein said envelope cross-sectional profile is in the form of a segment of a circle of predetermined diameter, the segment being defined by a corresponding arc portion and a corresponding chord portion, and, wherein for each said aerofoil profile, a respective first ratio of said chord to said diameter is in the range 70% to 87%, and, wherein for each said aerofoil profile, the respective first ratio is in the range 75% to 85%, and, including at least one of the following: wherein for each said aerofoil profile, a respective second ratio of said maximum thickness to said diameter is in the range 7% to 12%; wherein for each said aerofoil profile, a respective second ratio of said maximum absolute thickness to said diameter is in the range 8% to 14%.

18. The wing system according to claim 1, configured for maintain a negative said flap angle for each aerofoil of each wing during deployment from the pre-deployed configuration through to the deployed configuration.

19. An air vehicle, comprising the wing system as defined in claim 1.

20. A launch system comprising an air vehicle as defined in claim 19, accommodated in a fairing having an internal chamber defining said envelope, said envelope cross-sectional profile and said envelope cross-sectional area.

21. The wing system according to claim 1, wherein in said stowed configuration, the respective second element of each said aerofoil profile of each said wing is set at a respective negative flap angle.

22. The wing system according to claim 1, wherein in said stowed configuration, the respective second element of each said aerofoil profile of an uppermost said wing is set at a respective negative flap angle in a range −25° to −35°, and wherein the respective second element of each said aerofoil profile of a lowermost said wing is set at a respective negative flap angle in a range −55° to −65°.

23. A launch system comprising an air vehicle and one of a fairing or a container, the one of the fairing or the container defining a respective internal chamber defining a respective envelope having a respective envelope cross-sectional profile and a corresponding envelope cross-sectional area, the air vehicle including a wing system, the wing system having at least a stowed configuration, a pre-deployed configuration and a deployed configuration, the wing system comprising:

two wings, each said wing being pivotably deployable about a respective pivot axis between the pre-deployed configuration and the deployed configuration, wherein:
  in the stowed configuration the two wings are in first general superposed spatial relationship with respect to one another and are capable of being accommodated within the envelope; and
  in the pre-deployed configuration the two wings are in second general superposed spatial relationship with respect to one another and capable of deploying to the deployed configuration; and
  in the deployed configuration the wings are each capable of generating aerodynamic lift in an airstream;

each said wing having a span and an aerofoil profile at least at one respective transverse cross-section orthogonal to the respective span;

each said aerofoil profile being a slotted aerofoil having a primary element, a secondary element and a chord, the secondary element being pivotable with respect to the primary element and spaced therefrom by a gap, each said aerofoil profile having a respective maximum thickness, and a respective maximum absolute thickness;

wherein each said aerofoil profile is configured with a minimum respective said absolute thickness and a maximum said chord such that in said stowed configuration the respective said aerofoil profiles of said two wings in said first general superposed spatial relationship are accommodated within said envelope cross-sectional profile while concurrently maximizing occupancy of said envelope cross-sectional area.

\* \* \* \* \*